US008750580B2

(12) United States Patent
Nagashima et al.

(10) Patent No.: US 8,750,580 B2
(45) Date of Patent: Jun. 10, 2014

(54) COMPARING DEVICE

(75) Inventors: Sei Nagashima, Tokyo (JP); Hiroshi Nakajima, Tokyo (JP)

(73) Assignee: Azbil Corporation, Tokyo (JP)

( * ) Notice: Subject to any disclaimer, the term of this patent is extended or adjusted under 35 U.S.C. 154(b) by 211 days.

(21) Appl. No.: 13/468,345

(22) Filed: May 10, 2012

(65) Prior Publication Data

US 2012/0288164 A1 Nov. 15, 2012

(30) Foreign Application Priority Data

May 10, 2011 (JP) .................................. 2011-104998

(51) Int. Cl.
*G06K 9/62* (2006.01)

(52) U.S. Cl.
USPC ....................................................... 382/118

(58) Field of Classification Search
None
See application file for complete search history.

(56) References Cited

U.S. PATENT DOCUMENTS

| 6,603,882 | B2 * | 8/2003 | Oh et al. ....................... 382/217 |
| 6,697,504 | B2 * | 2/2004 | Tsai ............................... 382/118 |
| 6,778,703 | B1 * | 8/2004 | Zlotnick ........................ 382/218 |
| 7,627,178 | B2 * | 12/2009 | Suzuki et al. ................. 382/190 |
| 2003/0086616 | A1 * | 5/2003 | Oh et al. ........................ 382/209 |
| 2005/0135679 | A1 * | 6/2005 | Yoon et al. .................... 382/190 |
| 2007/0253624 | A1 * | 11/2007 | Becker ........................... 382/225 |
| 2007/0292019 | A1 * | 12/2007 | Terakawa ...................... 382/159 |
| 2008/0166016 | A1 * | 7/2008 | Sibiryakov et al. ........... 382/103 |
| 2009/0304266 | A1 * | 12/2009 | Aoki et al. .................... 382/154 |

FOREIGN PATENT DOCUMENTS

| JP | 10-63847 A | 3/1998 |
| JP | 2008-123141 A | 5/2008 |
| JP | 2008-209275 A | 9/2008 |

\* cited by examiner

*Primary Examiner* — Brian P Werner
(74) *Attorney, Agent, or Firm* — Troutman Sanders LLP

(57) ABSTRACT

When comparing a reference image and a registered image, a reference image is defined as a high-resolution image of the highest resolution and a first low-resolution image is generated on a lower level, and a second low-resolution image is generated on a lower level. Registered images are read one-at-a-time, feature regions are set in the hierarchical images of the registered images, and corresponding regions are found in the reference image through hierarchical searching from the low-resolution image towards the high-resolution image. An evaluation is made as to whether to select the registered image that has been read out, based on a similarity between the low-resolution hierarchical image, for example, a feature region of the hierarchical image of the registered image, and the corresponding region of the hierarchical image of the reference image, to narrow down the registered images to be compared to the reference image.

5 Claims, 13 Drawing Sheets

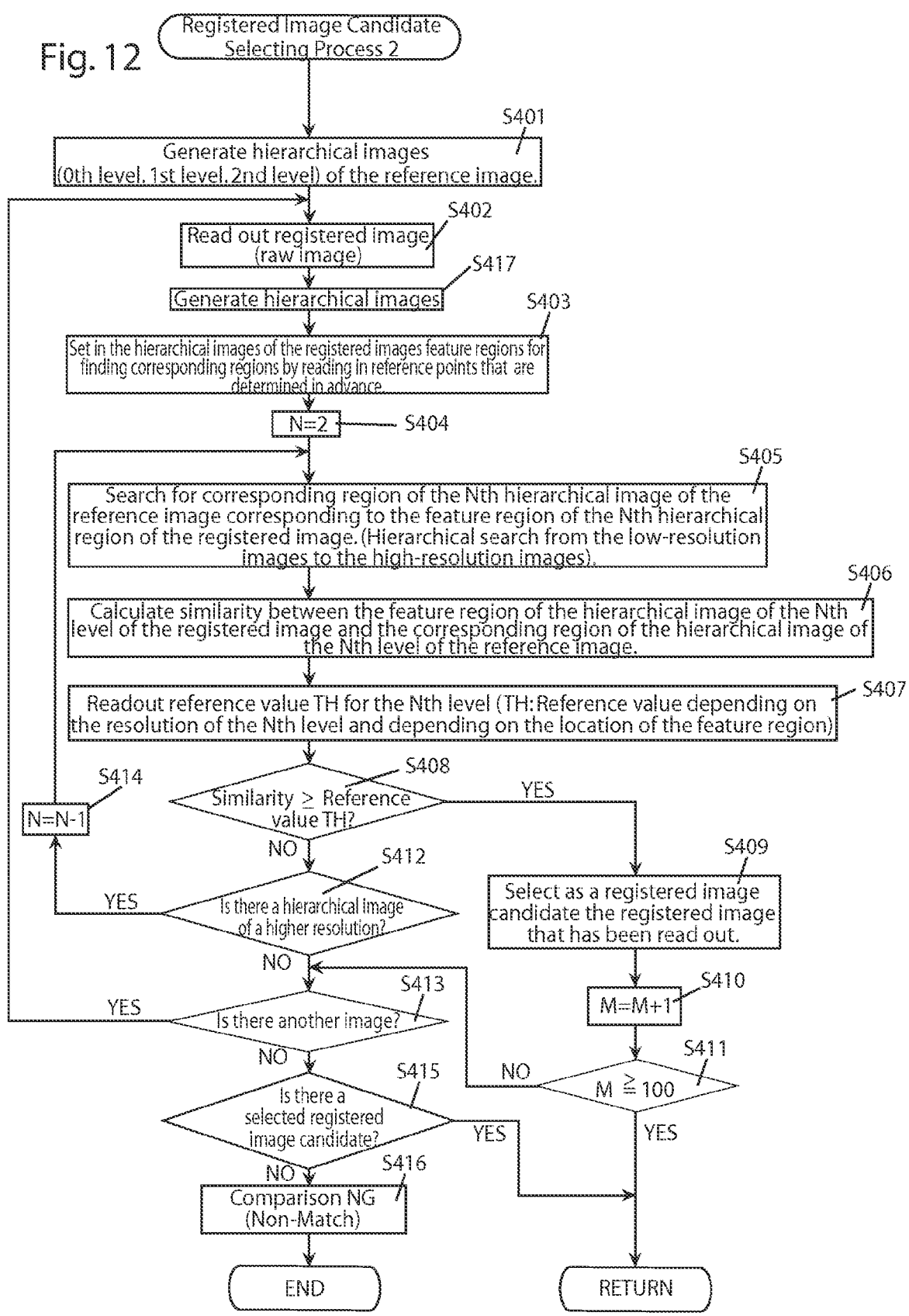

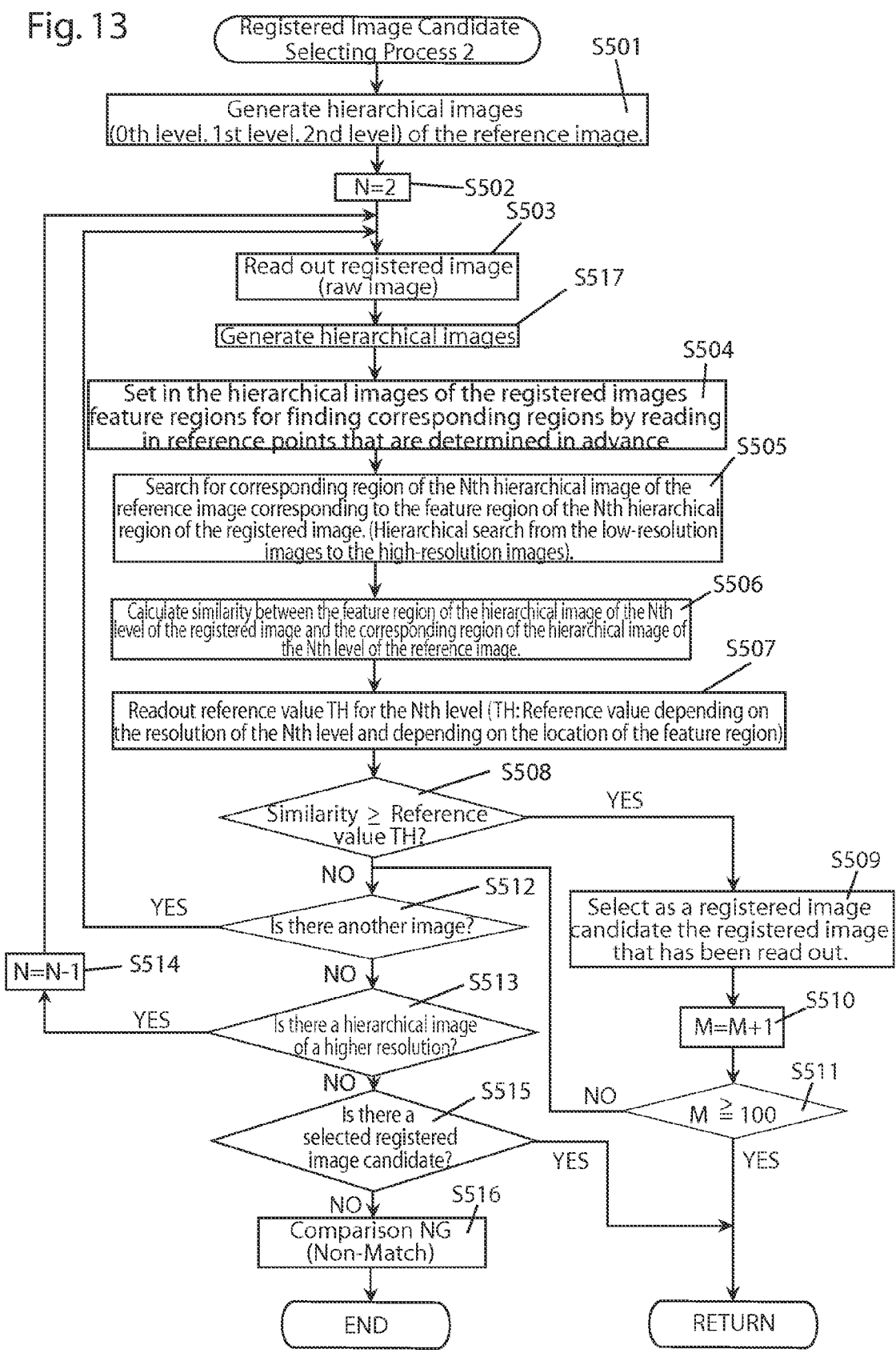

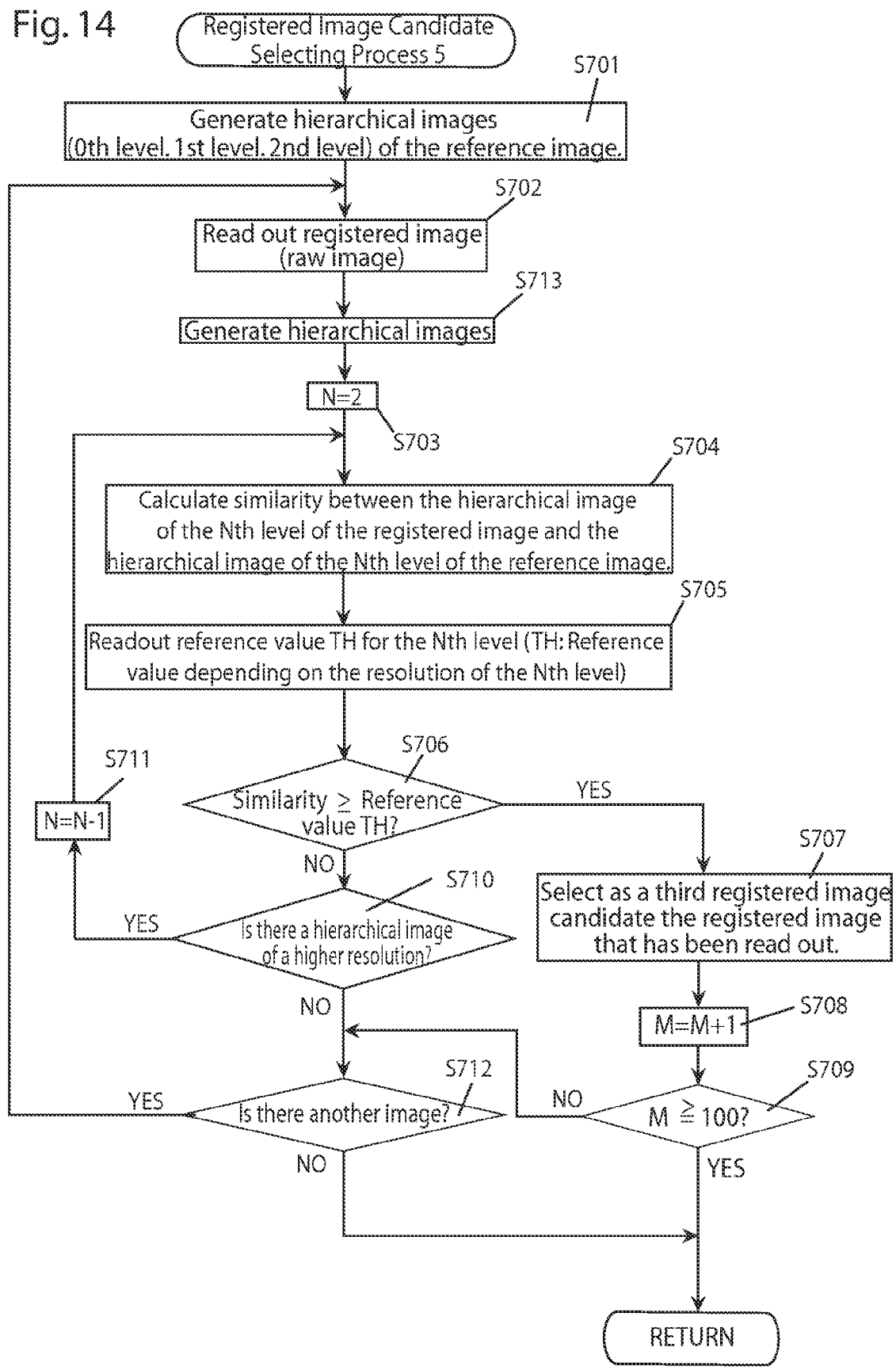

COMPARING DEVICE

CROSS REFERENCE TO RELATED APPLICATIONS

The present application claims priority under 35 U.S.C. §119 to Japanese Patent Application No. 2011-104998, filed May 10, 2011, which is incorporated herein by reference.

FIELD OF TECHNOLOGY

The present invention relates to a comparing device for comparing a reference image and a registered image.

BACKGROUND

In recent years systems have been developed for performing authentication of individuals based on biological information instead of on the PIN numbers or ID cards that have been used in the past in fields that require individual authentication, such as control of entry/exit into computer rooms or critical equipment rooms, control of access to computer terminals or financial terminals in banks, and the like.

Personal authentication systems that use biological information are of interest because they do not require memorization or possession of objects, and have a low risk of theft. While fingerprints, irises, faces, handprints, signatures, and the like are used in personal authentication using biological information, of these, personal authentication using the face is attracting attention as having excellent convenience and acceptance.

For example, in a personal authentication system used in entry/exit control of a building, or the like, a picture is taken of the face of the individual who will attempt to enter the building, and that picture is used as a reference image, where that reference image is compared to an image of the face of the individual that has been registered in advance (a registered image), to allow the individual to enter the building if the reference image and the registered image match.

The present applicant, in the process of comparing the reference image and the registered image, uses, for the respective reference image and registered image, a raw image as a high-resolution image that has the highest resolution, and creates a plurality of hierarchical images with different resolution levels with the high-resolution image at the highest level, to perform a search for corresponding points using a phase-only correlation method (POC), moving from the low-resolution images of these hierarchical images towards the high-resolution images (referencing, for example, Japanese Unexamined Patent Application Publication 2008-209275 ("JP '275") and Japanese Unexamined Patent Application Publication 2008-123141 ("JP '141"), to perform the comparison of the reference image and the registered image based on the phase-only correlation values of the corresponding regions after searching. In the below, the method for performing a comparison after searching for corresponding points using hierarchical images shall be termed "hierarchical POC."

In this hierarchical POC, with, for example, the raw image (a 128×128-pixel image) as the high-resolution image for the reference image, a 64×64-pixel image (a first low-resolution image) is created on the level under the high-resolution image, and a 32×32-pixel image (a second low-resolution image) is created on the level under the first low-resolution image. Moreover, as with the case for the reference image, for the registered image as well, the raw image (a 128×128-pixel image) as the high-resolution image, a 64×64-pixel image (a first low-resolution image) is created on the level under the high-resolution image, and a 32×32-pixel image (a second low-resolution image) is created on the level under the first low-resolution image. In the hierarchical images, including the raw images, the hierarchical level of the high-resolution images is defined as the zeroeth level, the hierarchical level of the first low-resolution image is defined as the first level, and the hierarchical level of the second low-resolution image is defined as the second level.

Moreover, m reference points are established in the x direction and n reference points are established in the y direction for the raw image of the registered image, and, for each reference point established for the raw image of the registered image, a search window (a local region) is established from the hierarchical image at the lowest level (the second level), to start the search for the corresponding region in the reference image corresponding to that local region. The search for the corresponding region is performed using POC comparison, and when the search for the corresponding region for the applicable hierarchical image is completed, the search results for the applicable hierarchical image are reflected into the search on the next hierarchical level (the first level), to perform searching for the corresponding regions for hierarchical images of sequentially higher resolutions, and the search for corresponding regions is repeated until arriving at the hierarchical image at the highest level (the zeroeth level).

Additionally, in the hierarchical image at the highest level (the zeroeth level), if a corresponding region is found, then a phase-only correlation value is calculated for that corresponding region. Thereafter, searching is performed in the same manner, searching for the corresponding region of the reference image for each local region of the registered image, starting with the low-resolution image, moving towards the high-resolution image, and calculating the phase-only correlation value for the corresponding region after searching, and then comparing the reference image and the registered image based on the calculated phase-only correlation values.

Note that POC is an algorithm for calculating the correlation between two images by performing mathematical processes on the original image data and on the data of the image to be compared thereto through a Fourier transform, to analyze into amplitudes (shading data) and phases (image contour data), and then using only the phase information to calculate the correlation between the two images, and has the distinctive features of being robust to external noises, to enable highly precise calculation results.

POC is explained in detail in JP '275 and JP '141, referenced above, and also in Japanese Unexamined Patent Application Publication H10-63847, and so forth. In POC, a two-dimensional discrete Fourier transform is performed on one of the images to produce a Fourier image. Following this, a Fourier image of the other image, produced through performing the same process as for the earlier Fourier image, is combined, and after performing a process to set the amplitudes of the combined Fourier images to 1, a two-dimensional discrete Fourier transform is performed to produce the correlation data. This correlation data (the POC function) has the amplitudes in the frequency space set to 1, so uses only the phases; however, fundamentally this can be considered to be data wherein one image is convolved with the other image, to express the correlation between the one image and the other image.

However, while it is possible to perform the comparison of the reference image and the registered image with high precision in the comparison using the hierarchical POC described above, the processing overhead is large when applied to 1:N comparisons wherein the reference image is compared to a plurality of registered images, and thus there is a problem in that this causes the speed of comparison to suffer.

The present invention is to solve problems such as described above, and the object thereof is to provide a comparing device able to provide both high precision and high-speed processing.

SUMMARY

In order to achieve this object, an example of the present invention is a comparing device for comparing a reference image and a registered image, including hierarchical image generating means for generating a plurality of hierarchical images of different resolutions, with the raw image as a high-resolution image of the highest resolution, with this high-resolution image as the highest level; registered image storing means for storing a plurality of registered images of the same resolution as the reference image; registered image reading means for reading out, one-at-a-time, registered images stored in the registered image storing means; feature region setting means for setting a feature region, determined in advance, for either a hierarchical image of the reference image, generated by the hierarchical image generating means, or a hierarchical image of the reference image corresponding to a hierarchical image of the reference image of a registered image read out by the registered image reading means; corresponding region searching means for searching, in the other hierarchical image, a corresponding region that corresponds to the feature region of the hierarchical image for which the feature region is set by the feature region setting means; and first recorded image candidate selecting means for selecting a registered image candidate for comparing a registered image, read out by the registered image reading means, to a reference image based on a similarity between a feature region that is established for one hierarchical image by the feature region setting means and a corresponding region, found in the other hierarchical image, by the corresponding region finding means.

In the present invention, when comparing a reference image and a registered image, for the reference image the raw image is defined as a high-resolution image having the highest resolution, where a plurality of hierarchical images having different levels of resolution are created with this high-resolution image as the highest level. Moreover, registered images are read out one at a time from registered image storing means, and the registered images that have been read out are evaluated as to whether or not they are registered image candidates to be compared to the reference image. That is, prior to comparing the reference image and the registered images, the registered images that are actually to be compared are narrowed down. Doing so makes it possible to reduce the number of comparisons in the 1:N comparisons, making it possible to achieve both high precision and high-speed processing.

In the example of the present invention, a plurality of registered images of the same resolution as the reference image are stored in the registered image storing means. In this case, the registered images may be stored for only the raw images of the registered images, or hierarchical images, including the raw images, may be stored for the registered images. If hierarchical images are stored for the registered images, then a plurality of hierarchical images having different resolutions are stored corresponding to hierarchical images for the reference image, with the raw image defined as a high-resolution image with the highest resolution, where this high-resolution image is defined as the highest level.

In the example of the present invention, when hierarchical images of the registered images are stored, then hierarchical images that include the raw image are read out as the registered images. In this case, feature regions are set for the hierarchical images of the reference images that have been generated or hierarchical images of the registered images that have been read out. For example, a zone that includes a distinctive portion, such as an eye or a nose, is set as a feature region. Additionally, a corresponding region corresponding to the feature region of one of the hierarchical images wherein a feature region has been set is searched in the other hierarchical images, to perform the selection of the registered image candidates based on the degree of similarity between the feature regions that have been set in one hierarchical image and the corresponding region that has been searched in the other hierarchical image.

In the examples of the present invention, when only the raw images of the registered images are stored, then the raw image is read out as the registered image, that raw image is defined as the high-resolution image with the highest resolution, and a plurality of hierarchical images with different resolutions is generated using this high-resolution image as the highest level. The hierarchical images of the registered image are produced corresponding to the hierarchical images of the reference image. Given this, feature regions are set for the hierarchical images of the reference image or for the hierarchical images of the registered image, and a corresponding region, corresponding to the feature region of the one hierarchical image for which the feature region has been set, is searched in the other hierarchical image, to select registered image candidates based on the degree of similarity between the feature region set in the one hierarchical image and the corresponding region searched from the other hierarchical image.

In examples of the present invention, the searching for the corresponding region is performed through hierarchical searching, for example, moving from the low-resolution image to the high-resolution image. In this case, the calculation of the degree of similarity between the feature region and the corresponding region is performed using a hierarchical image of an arbitrarily low resolution, and if the degree of similarity satisfies a specific reference value, then the registered image that has been read out is selected as a registered image candidate. Moreover, in this case reference values that are determined in accordance with the resolution of the hierarchical level and the position of the feature region are used as the reference values for each hierarchical level in the hierarchical images.

In the examples, the structure may be one wherein measured information acquiring means for acquiring specific measured information from the reference image, and second registered image candidate selecting means for selecting registered image candidates for comparison with the reference image, from a plurality of registered images that is stored in registered image storing means, based on measured information acquired by the measured information acquiring means are provided, wherein the first registered image candidate selecting means selects registered image candidates in combination with the registered image candidates selected by the second registered image candidate selecting means.

For example, the intraocular distance, face size, eye size, face curvature, and the like, are acquired from the reference image as the specific measured information, and the registered images are narrowed down based on these acquired measured information. Following this, the final registered image candidates are obtained through combining the registered images that are narrowed down based on this measured information with the registered images that are narrowed down based on the degree of similarity of the feature regions and the corresponding regions.

In this case, one may consider a variety of methods such as obtaining the final registered image candidates through further narrowing down those registered images, which have been narrowed down by the measured information, based on the degree of similarity of a feature region and a corresponding region, or obtaining the final registered image candidates by performing a logical AND of the registered images narrowed down based on the measured information with the registered images narrowed down based on the degree of similarity between the feature region and the corresponding region, or obtaining the final registered image candidates by taking a logical OR of the registered images narrowed down based on the measured information with the registered images narrowed down based on the degree of similarity between the feature region and the corresponding region.

Moreover, when, in the examples of the present invention, the number of selected registered image candidates is 0, the comparison result between the reference image and the registered images may be evaluated as being a non-match. For example, if the number of selected registered image candidates is 0 despite reading out all of the registered images that have been stored, then the comparison result between the reference image and the registered images is defined as a non-match. Doing this makes it possible to obtain the comparison result prior to performing the comparisons between the reference image and the registered images, that is, doing so in the stage of the categorizing process for narrowing down the registered images to be compared with the reference image.

In the examples of the present invention, registered images are read out one at a time, a feature region is set in either a hierarchical image of the reference image or a hierarchical image of the registered image, a corresponding region is searched from the other hierarchical image corresponding to the feature region of the one hierarchical image for which the feature region has been set, and registered image candidates for comparing, to the reference image, the registered images that have been read out are selected based on the degree of similarity between the feature region that has been set for the one hierarchical image and the corresponding region searched in the other hierarchical image, thus narrowing down the registered images to be compared to the reference image, prior to performing the comparison of the reference image with the registered images, reducing the number of comparisons in the 1:N comparisons, thus making it possible to achieve both high precision and high-speed processing.

BRIEF DESCRIPTION OF THE DRAWINGS

FIG. 12 is a flowchart illustrating an alternate example of the Registered Image Candidate Selecting Process 2.

FIG. 13 is a flowchart illustrating an alternate example of the Registered Image Candidate Selecting Process 3.

FIG. 14 is a flowchart illustrating an alternate example of the Registered Image Candidate Selecting Process 5.

DETAILED DESCRIPTION

An example according to the present invention is explained below in detail, based on the drawings.

Figure 1:
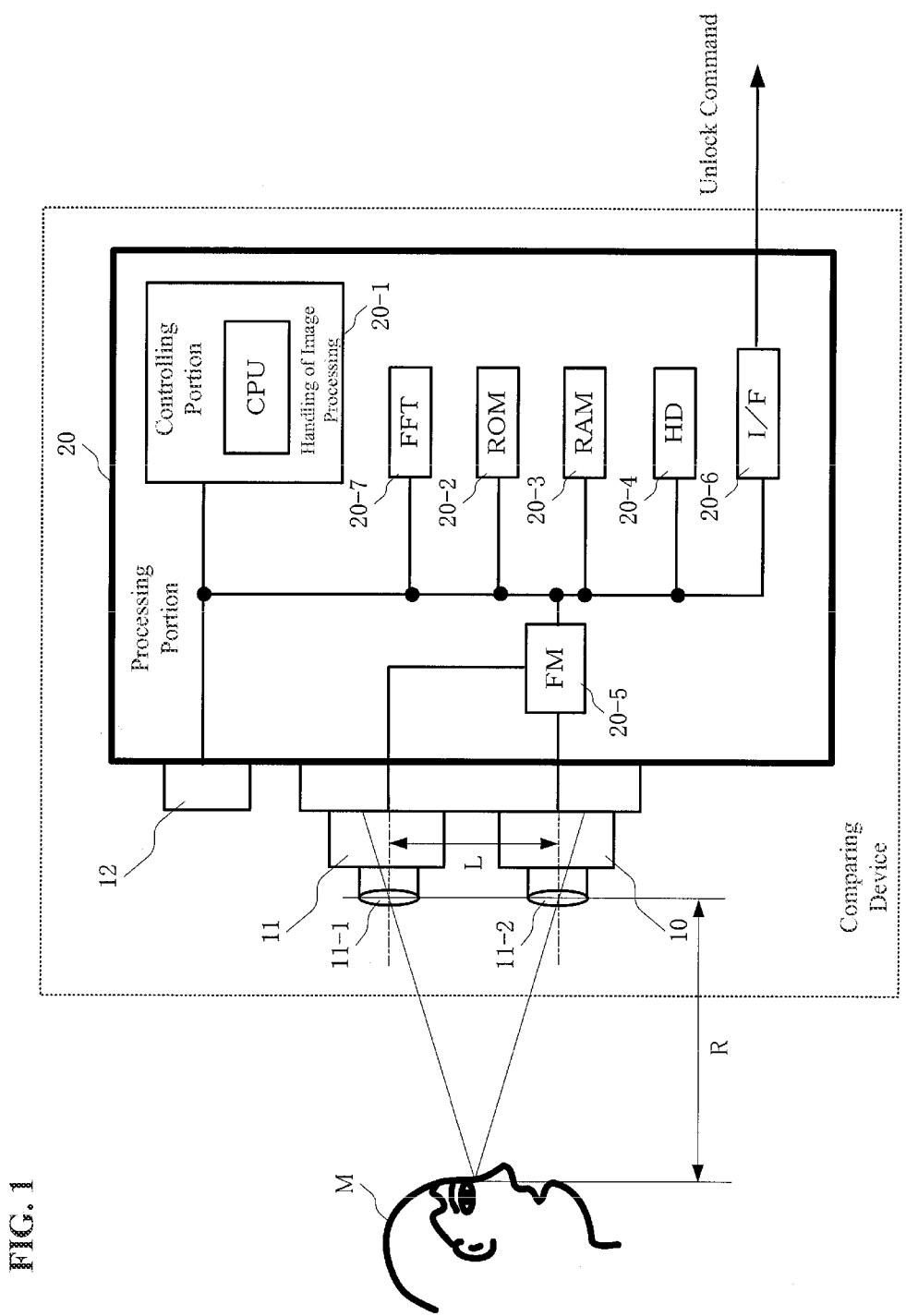
FIG. 1 is a block structural diagram of a comparing device, illustrating one example of the present invention.

FIG. 1 is a block structural diagram of a comparing device, illustrating one example of embodiment according to the present examples. In the figure, 10 is a first CCD camera, 11 is a second CCD camera, 12 is a liquid crystal display device (LCD), and 20 is a processing portion, wherein the processing portion 20 is provided with a controlling portion 20-1 that has a CPU, a ROM 20-2, a RAM 20-3, a hard disk (HD) 20-4, a frame memory (FM) 20-5, an external connecting portion (I/F) 20-6, and a Fourier transform portion (FFT) 20-7, wherein a recording program and a comparing program are stored in the ROM 20-2. Moreover, the CCD cameras 10 and 11 are disposed separated by a specific distance L. That is, the CCD cameras 10 and 11 are disposed in parallel, in the horizontal direction, with a distance L between the lenses 10-1 and 11-1 thereof. As can be understood easily from the figure, the comparing device is drawn when viewed from above, and the object (the human face) is drawn when viewed from the side.

In this comparing device, the recording of the object (the recording object) M1 is performed as described below in the case of the object being a human face M1. Prior to the operation, the user points the CCD cameras 10 and 11 at the face M1, and pushes a switch (not shown) to start the recording.

Figure 2:
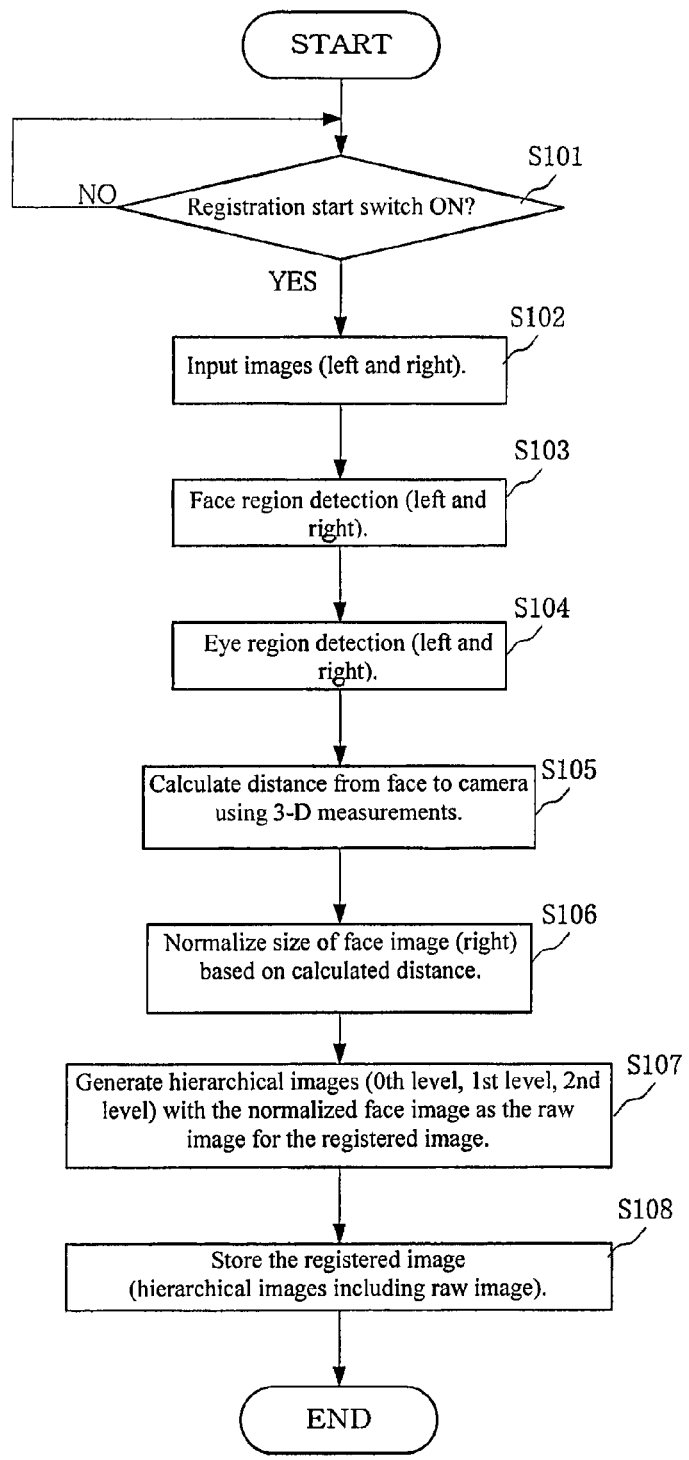
FIG. 2 is a flowchart of the object recording process in the comparing device.

When the switch for starting recording is pressed (FIG. 2, Step S101: YES), the controlling portion 20-1 captures, as a left camera image, an image that images the recorded object M1 from the CCD camera 10, and captures, as a right camera image, an image that images the recorded object M1 from the CCD camera 11, through the frame memory 20-5 (Step S102).

After this, the controlling portion 20-1 detects the face regions, through image processing, from the left camera image and right camera image that have been captured (Step S103). Note that if the brightness of the face region at this time is not within a specific range, then the gain is adjusted and the left camera image and the right camera image are captured again. Moreover, while in the present example the left and right face regions are detected, the detection instead may be for a single face region on either the left or the right.

After this, the controlling portion 20-1 performs image processing from the detected left and right face region images (left and right face images) to detect the eye regions (Step S104), and calculates the distance R from the camera to the recorded object M1 through 3-D calculations (Step S105), to normalize the size of the right face image based on the distance R that is calculated (Step S106).

After this, the controlling portion 20-1 defines the face image, normalized in Step S106, as the raw image of the registered image, defines the raw image (a 128×128-pixel image) as the high-resolution image of the highest level (the zeroeth level), generates a 64×64-pixel image (a first low-resolution image) on the level below the high-resolution image (the first level), and generates a 32×32-pixel image (the second low-resolution image) at the level below the first low-resolution image (the second level) (Step S107).

After this, the controlling portion 20-1 stores the hierarchical images, including the raw image (the high-resolution image, the first low-resolution image, and the second low-resolution image) in the hard disk 20-4 as the registered image of the user (Step S108). Following this, the same is performed for all of the users, to store registered images (hierarchical images including the raw images) for the users onto the hard disk 20-4. In the present example, the number of users is in the order of several thousand users, and the registered images of these users are stored on the hard disk 20-4.

Note that while in the present example the right face image is recorded, conversely, the left face image may be recorded instead, or the left and right face images may both be recorded. For the purpose of explanation, the right face image is recorded in the present example.

Figure 3:
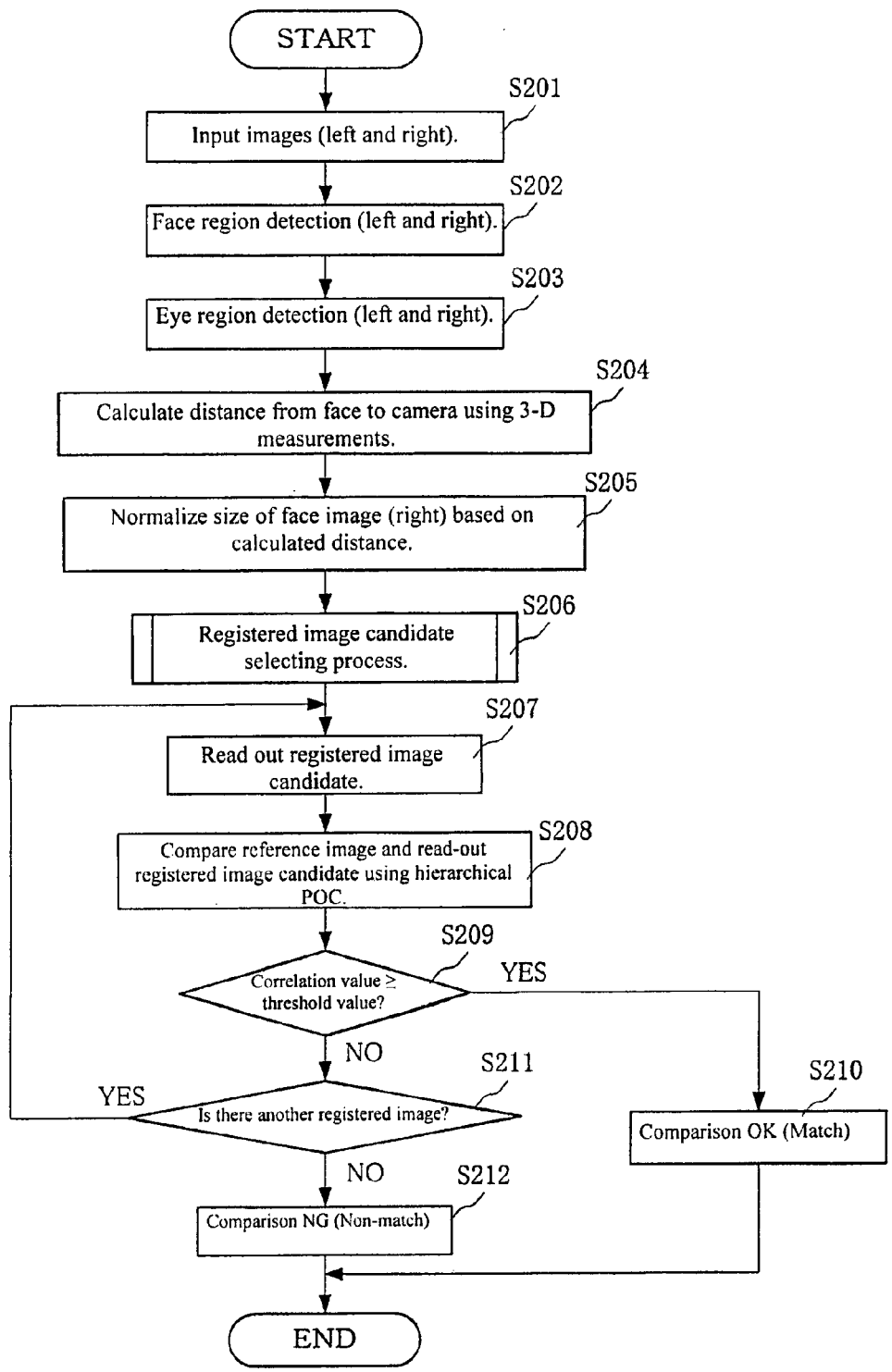
FIG. 3 is a flowchart illustrating the object comparing process in the comparing device.

In the comparing device, if the comparison object is defined as a human face M1, then the comparison of the face M1 is performed as described below. FIG. 3 is a flowchart for a comparing process that is performed in by the controlling portion 20-1 in accordance with a comparing program that is stored in the ROM 20-2.

The user stands in front of the CCD cameras 10 and 11. The controlling portion 20-1 recognizes that a face M1 has appeared within the imaging region of the CCD cameras 10 and 11, and obtains, through the frame memory 20-5, an image wherein the face M1 is captured by the CCD camera 10 as a left camera image and an image wherein the face M1 is captured by the CCD camera 11 as a right camera image (Step S201).

After this, the controlling portion 20-1 detects the face regions, through image processing, from the left camera image and right camera image that have been captured (Step S202). Note that if the brightness of the face region at this time is not within a specific range, then the gain is adjusted and the left camera image and the right camera image are captured again. Moreover, while in the present example the left and right face regions are detected, the detection instead may be for a single face region on either the left or the right.

After this, the controlling portion 20-1 performs image processing from the detected left and right face region images (left and right face images) to detect the eye regions (Step S203), and calculates the distance R from the camera to the comparison object M1 through 3-D calculations (Step S204), to normalize the size of the right face image based on the distance R that is calculated (Step S205).

Figure 4:
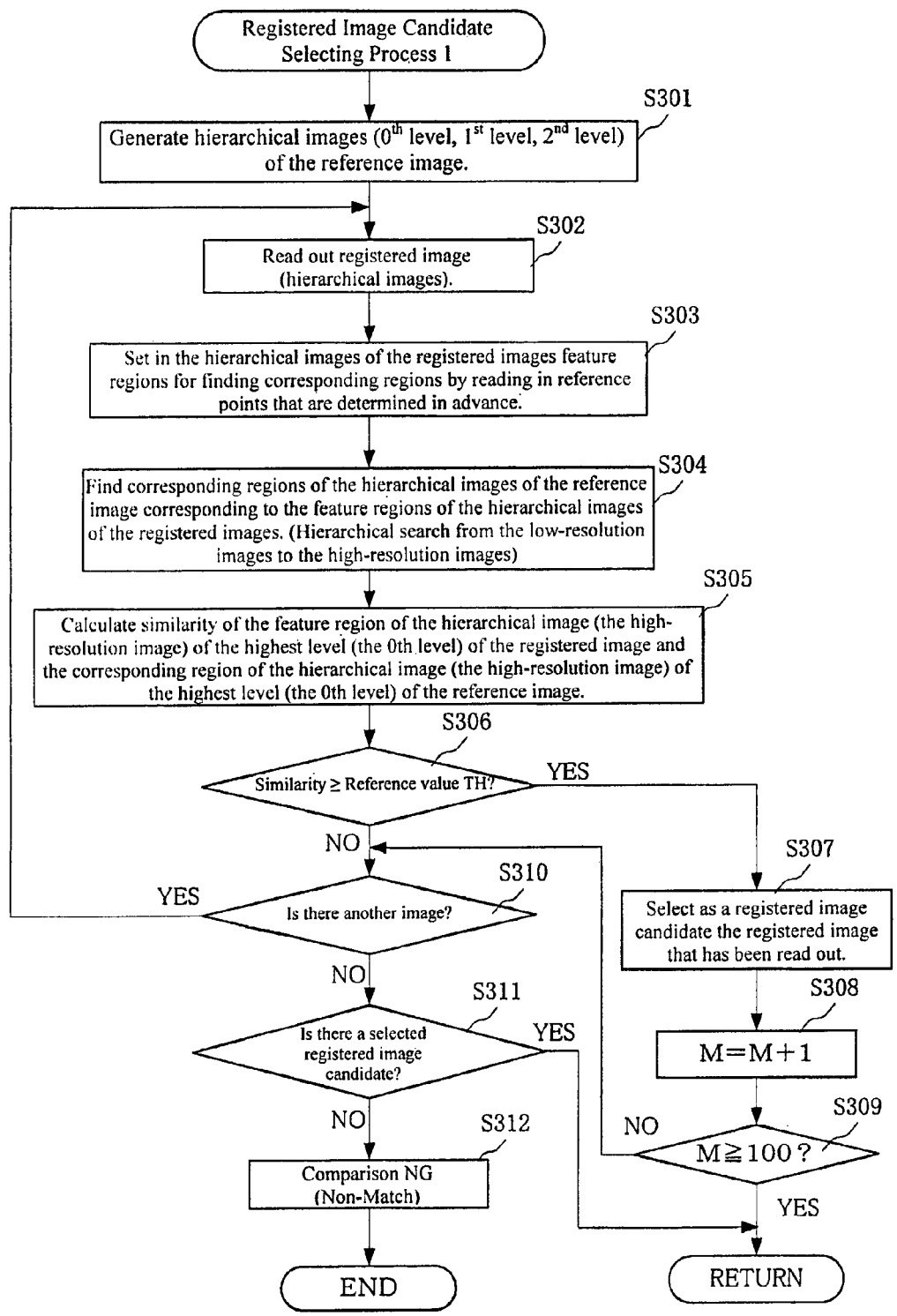
FIG. 4 is a flowchart illustrating a first example of a registered image candidate selecting process (Registered Image Candidate Selecting Process 1) in an object comparing process in the comparing device.

After this, the controlling portion 20-1 defines the face image that was normalized in Step S205 as the raw image for the reference image, and starts the process of selecting the registered image candidates for comparing with the reference image (Step S206). FIG. 4 illustrates, as an example, a flowchart of the registered image candidate selecting process (Registered Image Candidate Selecting Process 1).

In this registered image candidate selecting process 1, the controlling portion 20-1 defines the raw image of the reference image obtained in Step S205 (a 128×128-pixel image) as the high-resolution image of the highest level (the zeroeth level), generates a 64×64-pixel image (a first low-resolution image) on the level below the high-resolution image (the first level), and generates a 32×32-pixel image (the second low-resolution image) at the level below the first low-resolution image (the second level) (Step S301).

Additionally, the controlling portion 20-1 reads out the first registered image (the hierarchical images including the raw image) that is stored on the hard disk 20-4 (Step S302). That is, for the first registered image, the high-resolution image (the 128×128-pixel image) positioned at the highest level (the zeroeth level), the first low-resolution image (the 64×64-pixel image) that is positioned on the level below the high-resolution image (the first level), and the second low-resolution image (the 32×32-pixel image) that is positioned on the level below the first low-resolution image (the second level), are read out.

Figure 5:
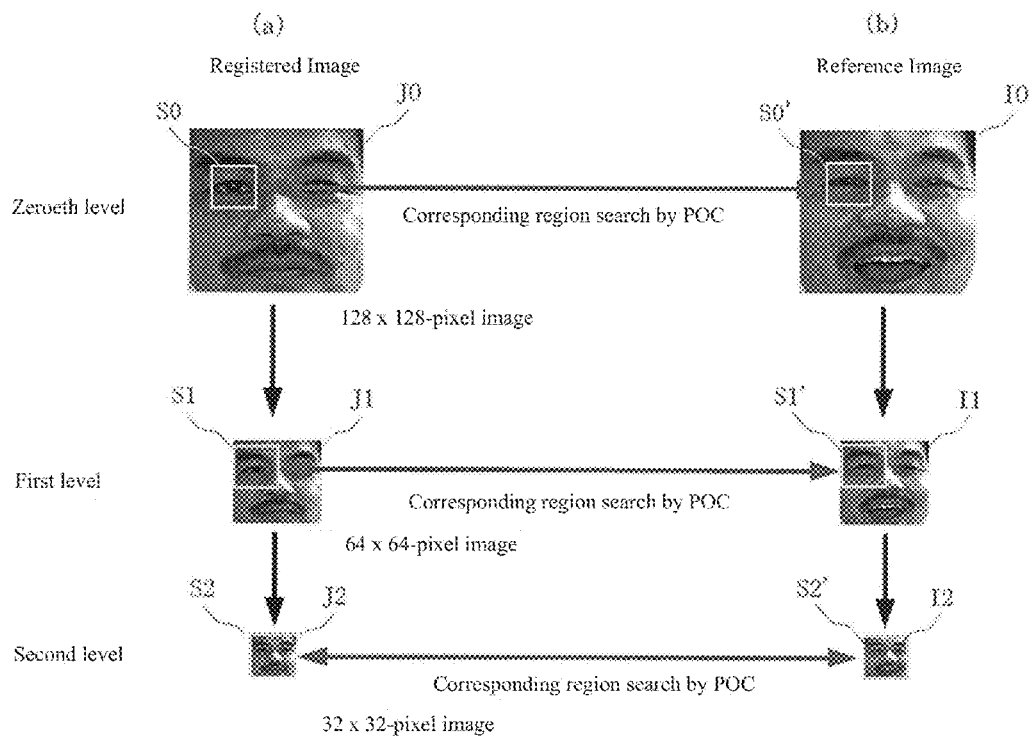
FIG. 5 is a diagram illustrating an example wherein a hierarchical image of a reference image that has been generated and a hierarchical image of a registered image that has been read out are matched for a feature region and a corresponding region in a registered image candidate selecting process.

FIGS. 5(*a*) and (*b*) illustrate an example of hierarchical images of the reference image, generated in Step S301, and the hierarchical images of the registered image read-out in Step S302. In FIG. 5(*a*), J0 is the hierarchical image located at the zeroeth level of the registered image (the high-resolution image (the 128×128-pixel image)), J1 is the hierarchical image located at the first level of the registered image (the first low-resolution image (the 64×64-pixel image)), and J2 is the hierarchical image located at the second level of the registered image (the second low-resolution image (the 32×32-pixel image)), and in FIG. 5(*b*), I0 is the hierarchical image located at the zeroeth level of the reference image (the high-resolution image (the 128×128-pixel image)), I1 is the hierarchical image located at the first level of the reference image (the first low-resolution image (the 64×64-pixel image)), and the I2 is the hierarchical image located at the second level of the reference image (the second low-resolution image (the 32×32-pixel image)).

The controlling portion 20-1, after obtaining the hierarchical images I0, I1 and I2 of the reference image and the hierarchical images J0, J1, and J2 of the registered image, reads in a reference point that has been established in advance, to set a feature region for searching for a corresponding region in the hierarchical images J0, J1, and J2 of the registered image (Step S303).

Figure 6:
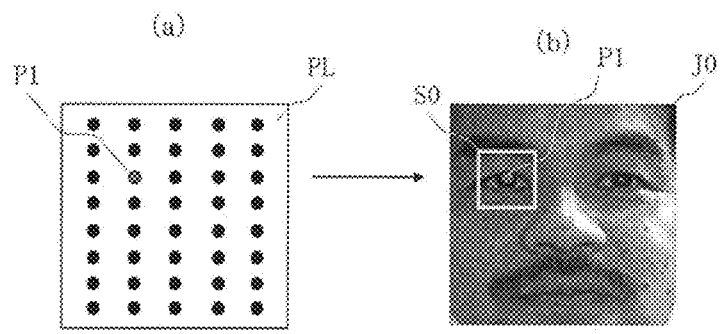
FIG. 6 is a diagram illustrating a reference point that has been established in advance as a point for defining a feature region, and a feature region that is set for a hierarchical image of the highest level in a registered image (the high-resolution image (the raw image)) centered on this reference point.

In the present example, the reference point the P1 that has been established in advance is read in as a point that specifies a feature region, from a template PL as illustrated in FIG. 6(*a*), set for the raw image of the registered image, to set, in the hierarchical image J0 of the registered image, a 32×32-pixel region, centered on the reference point P1, as a feature region S0. In the present example, the reference point P1 is established as a point in the hierarchical image J0 wherein the right eye will appear as a feature portion within the zone of the feature region S0.

Similarly, a 32×32-pixel region centered on a point corresponding to the reference point P1 in the hierarchical image J1 of the registered image is set as a feature region S1, and a 32×32-pixel region centered on a point corresponding to the reference point P1 in the hierarchical image J2 of the registered image is set as a feature region S2. Note that the hierarchical image J2 is a 32×32-pixel image, and thus the entirety of the hierarchical image J2 is set as the feature region S2.

Additionally, the controlling portion 20-1, through hierarchical searching from the low-resolution image towards the high-resolution image, performs searching for the corresponding regions of the hierarchical images of the reference image corresponding to the feature regions of the hierarchical images of the registered image (Step S304), to find a corresponding region S0' in the hierarchical image of the highest level (the zeroeth level) (the high-resolution image) I0 of the reference image corresponding to the feature region S0 in the highest level (the zeroeth level) of the hierarchical image (the high-resolution image) J0 of the registered image.

In this case, first the corresponding region S2', corresponding to the feature region S2, is searched through a POC comparison for the hierarchical images J2 and I2 on the lowest level (the second level). When the searching for the corresponding region on the lowest level has been completed, then searching for the search result on the lowest level is performed on the next hierarchical level (the first level), that is, it is used in searching, through POC comparison, for the corresponding region S1 that corresponds to the feature region S2 in the hierarchical images J1 and I1 of the first level.

Given this, when searching for the corresponding region on the first level has been completed, then searching for the search result on the first level is performed on the next hierarchical level (the zeroeth level), that is, it is used in searching, through POC comparison, for the corresponding region S0' that corresponds to the feature region S0 in the hierarchical images J0 and I0 on the zeroeth level. In this way, the corresponding region S0' in the hierarchical image on the highest level (the zeroeth level) (the high-resolution image) I0 of the reference image, corresponding to the feature region S0 in the hierarchical image on the highest level (the zeroeth level) (the high-resolution image) J0 of the registered image, is found.

After this, the controlling portion 20-1 calculates the degree of similarity between the feature region S0 that has been found in the hierarchical image J0 (the high-resolution image) of the registered image with the corresponding region S0' in the hierarchical image I0 (the high-resolution image) of the reference image (Step S305), and compares this calculated similarity to a reference value TH that has been established in advance (Step S306).

If the calculated similarity is equal to or greater than the reference value TH (Step S306: YES), then the registered image read-out in Step S302 is selected as a registered image candidate (Step S307), and the number M (which has an initial value of 0) of selected registered image candidates is set to M=M+1 (Step S308).

After this, after confirming that the number M of selected registered image candidates has not reached 100 (Step S309: NO), and after confirming that there is still another registered image on the hard disk 20-4 (Step S310: YES), the next registered image is read out from the hard disk 20-4 (Step S302), and processing repeats from Step S303.

Through the above, the hierarchical images of the registered images are read-out one-at-a-time from the hard disk 20-4, the degrees of similarity between the feature regions S0 in the hierarchical images J0 on the highest level of the registered images and the corresponding regions S0' in the hierarchical images I0 on the highest level in the reference image are calculated, the calculated similarities are compared to the reference value TH, and the registered images wherein the calculated similarities are equal to or greater than the reference value TH are selected as the registered image candidates.

Given this, if, during the iteration of these processes, the number M of selected registered image candidates reaches 100 (Step S309: YES), then the controlling portion 20-1 terminates the registered image candidate selecting process, and processing advances to Step S207 illustrated in FIG. 3.

Note that if there are no more registered images prior to the number M of selected registered image candidates reaching 100 during the iteration of these processes (Step S310: NO), then the controlling portion 20-1 checks whether or not there is a selected registered image candidate (Step S311). If, at this point, a selected registered image candidate exists (Step S311: YES), the registered image candidate selecting process is terminated, and processing advances to Step S207 shown in FIG. 3.

In contrast, if no selected registered image candidate exists (Step S311: NO), that is, if the number of selected registered image candidates is 0 notwithstanding having read-out all of the registered images from the hard disk 20-4, then the comparison result of the reference image to the registered images is defined as a non-match (Step S312), and processing is terminated. The comparison result in this case is displayed on the liquid crystal display device 12.

After the registered image candidate selecting process (Step S206), the controlling portion 20-1 reads out, from the hard disk 20-4, the first registered image candidate selected in this selecting process (Step S207). After this, the reference image obtained in Step S205 is compared to the registered image candidate read-out in Step S207, through hierarchical POC (Step S208). Hierarchical POC was described above, and so the detailed explanation thereof will be omitted here.

The correlation value obtained in the hierarchical POC is compared to a threshold value (Step S209), and if the correlation value is equal to or higher than the threshold value (Step S209: YES), then the comparison result for the reference image and the registered image is defined as a match (Step S210) and the processing is terminated. The comparison result in this case is displayed on the liquid crystal display device 12. Moreover, an unlocking command, or the like, is outputted through the external connecting portion 20-6.

If the correlation value is not equal to or greater than the threshold value (Step S209: NO), then the controlling portion 20-1, after confirming that there is still another registered image candidate on the hard disk 20-4 (Step S211: YES), reads out the next registered image candidate from the hard disk 20-4 (Step S207), and processing repeats from Step S208.

Through the above, the reading out of the registered image candidates sequentially from the hard disk 20-4, and the comparison, through hierarchical POC, of the registered image candidate should have been read-out and the reference image are repeated until the comparison result is a match.

If, during the iteration of the comparisons using this hierarchical POC there are no more registered image candidates (Step S211: NO), the controlling portion 20-1 defines the result of comparing the reference image to the registered images as a non-match (Step S102), and terminates processing. The comparison result in this case is displayed on the liquid crystal display device 12.

In this way, in the present example, the registered images for comparison with the reference image are narrowed down prior to comparing the reference image to the registered images, reducing the number of comparisons in the 1:N comparisons, to achieve both high precision and high-speed processing.

Note that while in the present example the comparisons of the registered image candidates and the reference image were performed using hierarchical POC, it need not necessarily be performed through hierarchical POC, but rather a common comparing technique that uses only the raw image may be used instead.

While in this case the comparison was of a two-dimensional image, the comparison may be performed for three-dimensional images instead. In the case of comparing three-dimensional images, one may consider the application of a comparison technique employing the ICP (Iterative Closest Point) algorithm.

Figure 7:
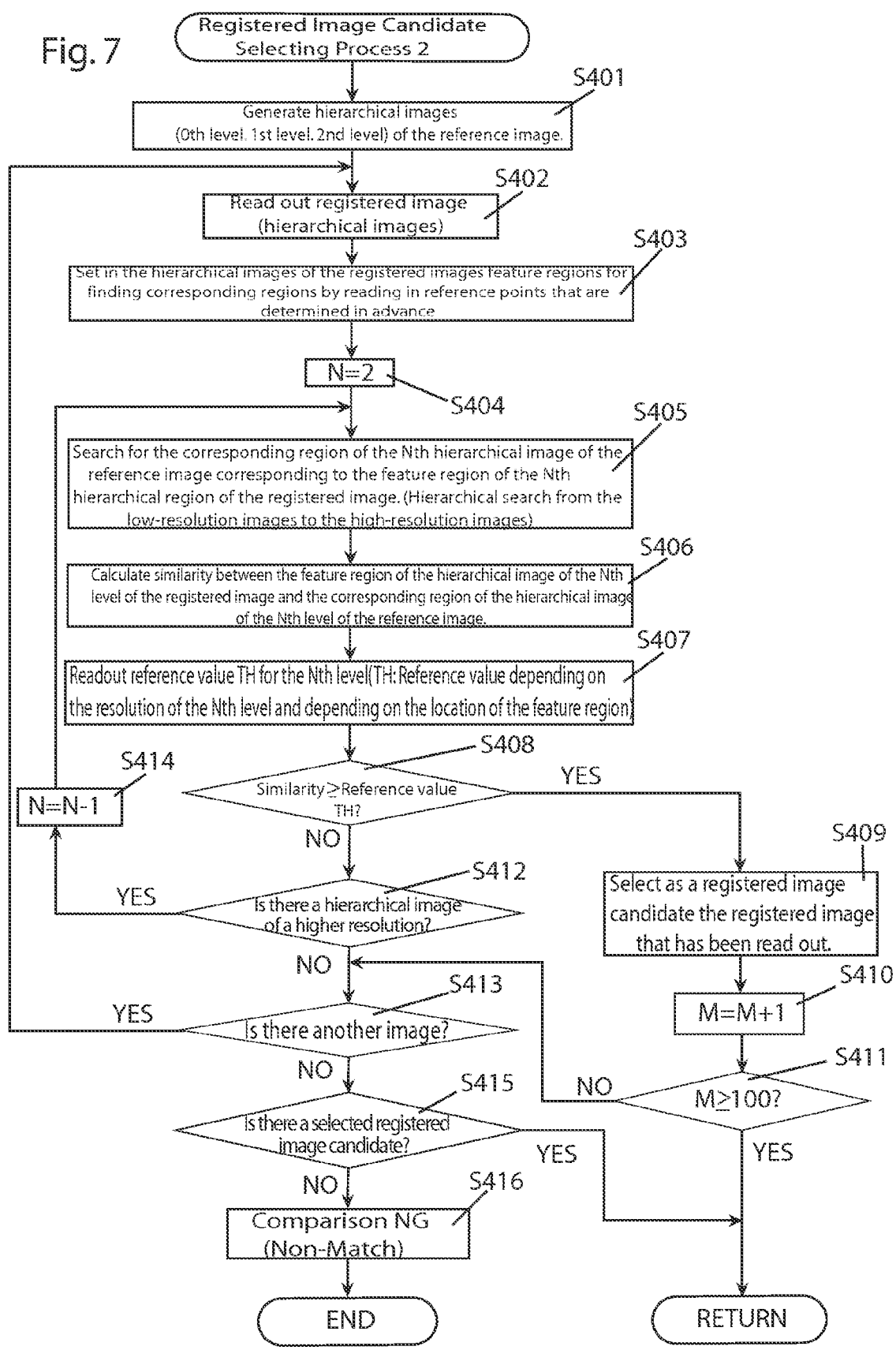
FIG. 7 is a flowchart illustrating a second example of a registered image candidate selecting process (Registered Image Candidate Selecting Process 2).

FIG. 7 illustrates, as a further example, another registered image candidate selecting process (Registered Image Candidate Selecting Process 2) in Step S206 in the flow chart illustrated in FIG. 3.

In this registered image candidate selecting process 2, the controlling portion 20-1 defines the raw image of the reference image obtained in Step S205 (a 128×128-pixel image) as the high-resolution image of the highest level (the zeroeth level), generates a 64×64-pixel image (a first low-resolution image) on the level below the high-resolution image (the first level), and generates a 32×32-pixel image (the second low-resolution image) at the level below the first low-resolution image (the second level) (Step S401, referencing FIG. 5(b)).

Additionally, the controlling portion 20-1 reads out the first registered image (the hierarchical images including the raw image) that is stored on the hard disk 20-4 (Step S402). That is, for the first registered image, the high-resolution image (the 128×128-pixel image) positioned at the highest level (the zeroeth level), the first low-resolution image (the 64×64-pixel image) that is positioned on the level below the high-resolution image (the first level), and the second low-resolution image (the 32×32-pixel image) that is positioned on the level below the first low-resolution image (the second level), are read out (referencing FIG. 5(a)).

Following this, the controlling portion 20-1 reads in the reference point P1 (see FIG. 6(a)) that has been established in advance, to set the feature regions S0, S1, and S2 for searching for the corresponding regions in the hierarchical images J0, J1, and J2 of the registered image (referencing FIG. 5(a), Step S403).

Given this, the controlling portion 20-1 sets N=2 (Step S404), and searches for the corresponding region of the $N^{th}$ level hierarchical image of the reference image corresponding to the feature region of the $N^{th}$ level hierarchical image of the registered image (Step S405). In this case, N=2, and thus the searching for the corresponding regions S2' of the second level hierarchical image I2 of the reference image corresponding to the feature region S2 of the second level hierarchical image J2 of the registered image is performed through POC comparison.

Following this, the controlling portion 20-1 calculates the similarity between the feature region S2 in the second level hierarchical image J2 of the registered image that has been found and the corresponding region S2' in the second level of the hierarchical image I2 of the reference image (Step S406), and reads in the second level reference value TH that has been set in advance (Step S407), to compare the calculated similarity with the second level reference value TH that has been read in (Step S408). Here the second layer reference value TH is established in accordance with the resolution of that hierarchical level and in accordance with the position of the feature region S2.

If the calculated similarity is equal to or greater than the second level reference value TH (Step S408: YES), then the registered image read-out in Step S402 is selected as a registered image candidate (Step S409), and the number M (which has an initial value of 0) of selected registered image candidates is set to M=M+1 (Step S410).

After this, after confirming that the number M of selected registered image candidates has not reached 100 (Step S411: NO), and after confirming that there is still another registered image on the hard disk 20-4 (Step S413: YES), the next registered image is read out from the hard disk 20-4 (Step S402), and processing repeats from Step S403.

If the calculated similarity is not equal to or greater than the second level reference value TH (Step S408: NO), then after confirming that there is a hierarchical image with a higher resolution (Step S412: YES), N is set to N-1 (Step S414), and processing returns to Step S405. In this case, N is set to 1, and thus the controlling portion 20-1 takes the result of the searching in the second hierarchical level into account, and searches for the corresponding region S1 of the first level hierarchical image I1 of the reference image corresponding to the feature region S1 of the first level hierarchical image J1 of the registered image through POC comparison (Step S405).

Following this, the controlling portion 20-1 calculates the similarity between the feature region S1 in the first level hierarchical image J1 of the registered image that has been found and the corresponding region S1' in the first level of the hierarchical image I1 of the reference image (Step S406), and reads in the first level reference value TH that has been set in advance (Step S407), to compare the calculated similarity with the first level reference value TH that has been read in (Step S408). Here the first layer reference value TH is established in accordance with the resolution of that hierarchical level and in accordance with the position of the feature region S1.

If the calculated similarity is equal to or greater than the first level reference value TH (Step S408: YES), then the registered image read-out in Step S402 is selected as a registered image candidate (Step S409), and the number M of selected registered image candidates is set to M=M+1 (Step S410).

After this, after confirming that the number M of selected registered image candidates has not reached 100 (Step S411: NO), and after confirming that there is still another registered image on the hard disk 20-4 (Step S413: YES), the next registered image is read out from the hard disk 20-4 (Step S402), and processing repeats from Step S403.

If the calculated similarity is not equal to or greater than the first level reference value TH (Step S408: NO), then after confirming that there is a hierarchical image with a higher resolution (Step S412: YES), N is set to N-1 (Step S414), and processing returns to Step S405. In this case, N is set to 0, and thus the controlling portion 20-1 takes the result of the searching in the first hierarchical level into account, and searches for the corresponding region S0 of the zeroeth level hierarchical image I0 of the reference image corresponding to the feature region S1 of the first level hierarchical image J0 of the registered image through POC comparison (Step S405).

Following this, the controlling portion 20-1 calculates the similarity between the feature region S0 in the zeroeth level hierarchical image J0 of the registered image that has been found and the corresponding region S0' in the zeroeth level of the hierarchical image J0 of the reference image (Step S406), and reads in the zeroeth level reference value TH that has been set in advance (Step S407), to compare the calculated similarity with the zeroeth level reference value TH that has been read in (Step S408). Here the zeroeth layer reference value TH is established in accordance with the resolution of that hierarchical level and in accordance with the position of the feature region S0.

If the calculated similarity is equal to or greater than the first level reference value TH (Step S408: YES), then the registered image read-out in Step S402 is selected as a registered image candidate (Step S409), and the number M of selected registered image candidates is set to M=M+0 (Step S410).

After this, after confirming that the number M of selected registered image candidates has not reached 100 (Step S411: NO), and after confirming that there is still another registered image on the hard disk 20-4 (Step S413: YES), the next registered image is read out from the hard disk 20-4 (Step S402), and processing repeats from Step S403.

If the calculated similarity is not equal to or greater than the zeroeth level reference value TH (Step S408: NO), then the controlling portion 20-1 checks whether or not there is a hierarchical image with a higher resolution (Step S412). In this case, there is no hierarchical image with a higher resolution than the zeroeth level (Step S412: NO), so after confirming that there is another registered image on the disk 20-4 (Step S413: YES), the next registered image is read out from the hard disk 20-4 (Step S402), and the process repeats from Step S403.

Through the above, the hierarchical images of the registered images are read out sequentially from the hard disk 20-4, and the similarities between the feature regions of the hierarchical images of the registered images and the corresponding regions of the hierarchical images of the reference image are calculated sequentially starting with the lowest resolution, where the calculated similarities are compared to the reference values TH for the hierarchical levels, to select, as registered image candidates, the registered images wherein the similarity on one of the hierarchical levels is confirmed to be no less than the threshold value TH.

Given this, if, during the iteration of these processes, the number M of selected registered image candidates reaches 100 (Step S411: YES), then the controlling portion 20-1 terminates the registered image candidate selecting process, and processing advances to Step S207 illustrated in FIG. 3.

Note that if there are no more registered images prior to the number M of selected registered image candidates reaching 100 during the iteration of these processes (Step S413: NO), then the controlling portion 20-1 checks whether or not there is a selected registered image candidate (Step S415). If, at this point, a selected registered image candidate exists (Step S415: YES), the registered image candidate selecting process is terminated, and processing advances to Step S207 shown in FIG. 3.

In contrast, if no selected registered image candidate exists (Step S415: NO), that is, if the number of selected registered image candidates is 0 notwithstanding having read-out all of the registered images from the hard disk 20-4, then the comparison result of the reference image to the registered images is defined as a non-match (Step S416), and processing is terminated. The comparison result in this case is displayed on the liquid crystal display device 12.

Note that in this example, N was set to 2 in Step S404, to start, from the hierarchical image on the second level (the lowest level), the searching for the corresponding region that corresponds to the feature region and the calculation of similarity, but instead N may be set to 1 in Step S404, to start, from the hierarchical image on the first level, the searching for the corresponding region that corresponds to the feature region and the calculation of the similarity.

Figure 8:
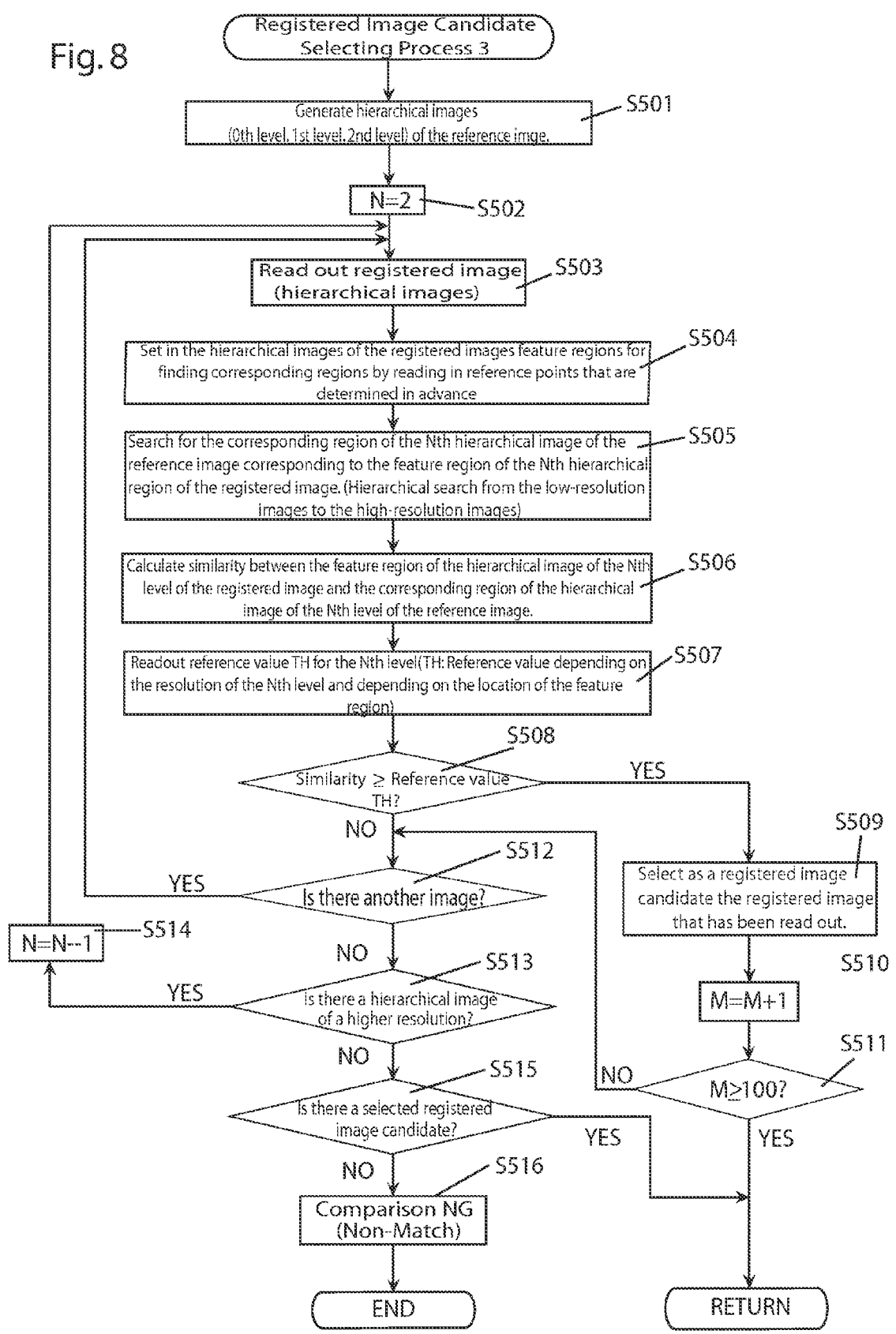
FIG. 8 is a flowchart illustrating a second example of a registered image candidate selecting process (Registered Image Candidate Selecting Process 3).

FIG. 8 illustrates, as a yet further example, another registered image candidate selecting process (Registered Image Candidate Selecting Process 3) in Step S206 in the flow chart illustrated in FIG. 3.

In this registered image candidate selecting process 3, the controlling portion 20-1 defines the raw image of the reference image obtained in Step S205 (a 128×128-pixel image) as the high-resolution image of the highest level (the zeroeth level), generates a 64×64-pixel image (a first low-resolution image) on the level below the high-resolution image (the first level), and generates a 32×32-pixel image (the second low-resolution image) at the level below the first low-resolution image (the second level) (Step S501, referencing FIG. 5(b)).

Additionally, the controlling portion 20-1 sets N=2 (Step S502), and reads out the first registered image (the hierarchical images including the raw image) that is stored on the hard disk 20-4 (Step S502). That is, for the first registered image, the high-resolution image (the 128×128-pixel image) positioned at the highest level (the zeroeth level), the first low-resolution image (the 64×64-pixel image) that is positioned on the level below the high-resolution image (the first level), and the second low-resolution image (the 32×32-pixel image) that is positioned on the level below the first low-resolution image (the second level), are read out (referencing FIG. 5(a)). Following this, the controlling portion 20-1 reads in the reference point P1 (see FIG. 6(a)) that has been established in advance, to set the feature regions S0, S1, and S2 for searching for the corresponding regions in the hierarchical images J0, J1, and J2 of the registered image (referencing FIG. 5(a), Step S504).

Given this, the controlling portion 20-1 searches for the corresponding region of the $N^{th}$ level hierarchical image of the reference image corresponding to the feature region of the $N^{th}$ level hierarchical image of the registered image. In this case, N=2, and thus the searching for the corresponding regions S2' of the second level hierarchical image 12 of the reference image corresponding to the feature region S2 of the second level hierarchical image J2 of the registered image is performed through POC comparison.

Following this, the controlling portion 20-1 calculates the similarity between the feature region S2 in the second level hierarchical image J2 of the registered image that has been found and the corresponding region S2' in the second level of the hierarchical image 12 of the reference image (Step S506), and reads in the second level reference value TH that has been set in advance (Step S407), to compare the calculated similarity with the second level reference value TH that has been read in (Step S408). Here the second layer reference value TH is established in accordance with the resolution of that hierarchical level and in accordance with the position of the feature region S2.

If the calculated similarity is equal to or greater than the second level reference value TH (Step S508: YES), then the registered image read-out in Step S503 is selected as a registered image candidate (Step S509), and the number M (which has an initial value of 0) of selected registered image candidates is set to M=M+1 (Step S510).

After this, after confirming that the number M of selected registered image candidates has not reached 100 (Step S511: NO), and after confirming that there is still another registered image on the hard disk 20-4 (Step S512: YES), the next registered image is read out from the hard disk 20-4 (Step S503), and processing repeats from Step S504.

If the calculated similarity is not equal to or higher than the second reference value TH (Step S508: NO), then after confirming that there is another registered image on the hard disk 20-4 (Step S512: YES), the next registered image is read out from the hard disk 20-4 (Step S503), and the process repeats from Step S504.

Through the above, the hierarchical images of the registered images are read-out one-at-a-time from the hard disk 20-4, the degrees of similarity between the feature regions in the hierarchical images on the second level of the registered images and the corresponding regions in the hierarchical images on the second level in the reference image are calculated, the calculated similarities are compared to the second reference value TH, and the registered images wherein the calculated similarities have been confirmed to be equal to or greater than the reference value TH are selected as the registered image candidates.

Additionally, if, during this process, all of the registered images are read out from the hard disk 20-4 so that there are no more registered images (Step S512: NO), then the controlling portion 20-1 confirms that there is a hierarchical image of a higher resolution (Step S513: YES), sets N to N-1 (Step S514), and returns to Step S503.

Through this, the controlling portion 20-1 reads out again the first registered image (a hierarchical image, including the raw image) that is stored on the hard disk 20-4 (Step S503) and repeats the process beginning with Step S504.

In this case, N equals 1, and thus the searching for the corresponding region S2' in the hierarchical image I1 of the first level of the reference image corresponding to the feature region S1 of the hierarchical image J1 of the first level of the registered image is performed through POC comparison (Step S505), where the similarity of this feature region S1 that has been found in the hierarchical image J1 of the first level in the registered image and the corresponding region S1' in the hierarchical image I1 of the first level in the reference image is calculated (Step S506), the reference value TH for the first level, which has been set in advance, is read out (Step S507), and the calculated similarity and the reference value TH for the first level, which has been read out, are compared (Step S508). Here the first layer reference value TH is established in accordance with the resolution of that hierarchical level and in accordance with the position of the feature region S1.

If the calculated similarity is equal to or greater than the first level reference value TH (Step S508: YES), then the registered image read-out in Step S503 is selected as a registered image candidate (Step S509), and the number M selected registered image candidates is set to M=M+1 (Step S510).

After this, after confirming that the number M of registered image candidates has not reached 100 (Step S511: NO), and after confirming that there is still another registered image on the hard disk 20-4 (Step S512: YES), the next registered image is read out from the hard disk 20-4 (Step S503), and processing repeats from Step S504.

If the calculated similarity is not equal to or higher than the first level reference value TH (Step S508: NO), then after confirming that there is another registered image on the hard disk 20-4 (Step S512), the next registered image is read out from the hard disk 20-4 (Step S503), and the process repeats from Step S504.

Through the above, the hierarchical images of the registered images are read-out one-at-a-time from the hard disk 20-4, the degrees of similarity between the feature regions in the hierarchical images on the first level of the registered images and the corresponding regions in the hierarchical images on the first level in the reference image are calculated, the calculated similarities are compared to the first level reference value TH, and the registered images wherein the calculated similarities have been confirmed to be equal to or greater than the first level reference value TH are selected as the registered image candidates.

Additionally, if, during this process, all of the registered images are read out from the hard disk 20-4 so that there are no more registered images (Step S512: NO), then the controlling portion 20-1 confirms that there is a hierarchical image of a higher resolution (Step S513: YES), sets N to N-1 (Step S514), and returns to Step S503.

Through this, the controlling portion 20-1 reads out again the first registered image (a hierarchical image, including the raw image) that is stored on the hard disk 20-4 (Step S503) and repeats the process beginning with Step S504.

In this case, N equals 0, and thus the searching for the corresponding region S0' in the hierarchical image I0 of the zeroeth level of the reference image corresponding to the feature region S0 of the hierarchical image J0 of the zeroeth level of the registered image is performed through POC comparison (Step S505), where the similarity of this feature region S0 that has been found in the hierarchical image J0 of the zeroeth level in the registered image and the corresponding region S0' in the hierarchical image I0 of the zeroeth level in the reference image is calculated (Step S506), the reference value TH for the zeroeth level, which has been set in advance, is read out (Step S507), and the calculated similarity and the reference value TH for the zeroeth level, which has been read out, are compared (Step S508). Here the zeroeth layer reference value TH is established in accordance with the resolution of that hierarchical level and in accordance with the position of the feature region S0.

If the calculated similarity is equal to or greater than the first level reference value TH (Step S508: YES), then the registered image read-out in Step S503 is selected as a registered image candidate (Step S509), and the number M selected registered image candidates is set to M=M+0 (Step S510).

After this, after confirming that the number M of registered image candidates has not reached 100 (Step S511: NO), and after confirming that there is still another registered image on the hard disk 20-4 (Step S512: YES), the next registered image is read out from the hard disk 20-4 (Step S503), and processing repeats from Step S504.

If the calculated similarity is not equal to or higher than the zeroeth level reference value TH (Step S508: NO), then after confirming that there is another registered image on the hard disk 20-4 (Step S512), the next registered image is read out from the hard disk 20-4 (Step S503), and the process repeats from Step S504.

Through the above, the hierarchical images of the registered images are read-out one-at-a-time from the hard disk 20-4, the degrees of similarity between the feature regions in the hierarchical images on the zeroeth level of the registered images and the corresponding regions in the hierarchical images on the zeroeth level in the reference image are calculated, the calculated similarities are compared to the zeroeth level reference value TH, and the registered images wherein the calculated similarities have been confirmed to be equal to or greater than the zeroeth level reference value TH are selected as the registered image candidates.

Note that if, during the iteration of these processes, the number M of selected registered image candidates reaches 100 (Step S511: YES), then the controlling portion 20-1 terminates the registered image candidate selecting process, and processing advances to Step S207 illustrated in FIG. 3.

Moreover, if there are no more hierarchical images of a higher resolution prior to the number M of selected registered image candidates reaching 100 during the iteration of these processes (Step S513: NO), then the controlling portion 20-1 checks whether or not there is a selected registered image candidate (Step S515). If, at this point, a selected registered image candidate exists (Step S515: YES), the registered image candidate selecting process is terminated, and processing advances to Step S207 shown in FIG. 3.

In contrast, if no selected registered image candidate exists (Step S515: NO), that is, if for all the levels, that is, the first level, the second level, and the zeroeth level, the number of selected registered image candidates is 0 notwithstanding having read-out all of the registered images from the hard disk 20-4, then the comparison result of the reference image to the registered images is defined as a non-match (Step S516), and processing is terminated. The comparison result in this case is displayed on the liquid crystal display device 12.

Note that in this example, N was set to 2 in Step S501, to start, from the hierarchical image on the second level (the lowest level), the searching for the corresponding region that corresponds to the feature region and the calculation of similarity, but instead N may be set to 1 in Step S502, to start, from the hierarchical image on the first level, the searching for the corresponding region that corresponds to the feature region and the calculation of the similarity.

Moreover, although in the examples set forth above the feature regions S0, S1, and S2 were established in the hierarchical images J0, J1, and J2 of the registered images, instead the feature regions S0, S1, and S2 may be established in the hierarchical images J0, I1, and I2 of the reference image, and the corresponding regions S0', S1', and S2' may be searched in the hierarchical images J0, J1, and J2 of the registered images.

Figure 9:
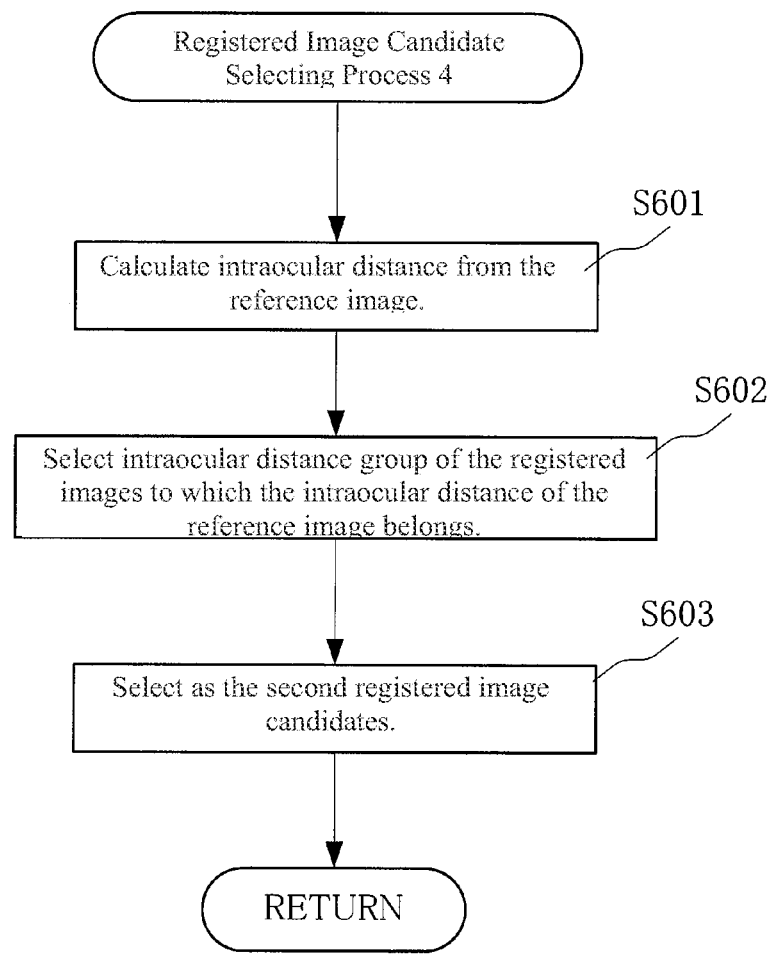
FIG. 9 is a flowchart of a registered image process 4 wherein the registered image candidate selecting processes 1, 2, and 3 are used in combination.

A flowchart of the registered image candidate selecting process 4 is shown in FIG. 9. In this example, the registered image candidate selecting processes 1, 2, and 3 are combined with this registered image candidate selecting process 4, to produce the final registered image candidates. Note that in this example, the registered image candidates selected by the registered image candidate selecting processes 1, 2, and 3 are defined as first registered image candidates, and the registered image candidates selected by the registered image candidate selecting process 4 are defined as second registered image candidates.

In the registered image candidate selecting process 4, the controlling portion 20-1 calculates an intraocular distance (Step S601) as measurement information from the reference image obtained in Step S205, and selects, from the hard disk 20-4, an intraocular distance group that contains the calculated intraocular distance (Step S602). The registered images of this intraocular distance group are selected as the second registered image candidates (Step S603).

Given this, the controlling portion 20-1 combines the second registered image candidates, selected by the registered image candidate selecting process 4, with the first registered image candidates, selected by the registered image candidate selecting processes 1, 2, and 3, to obtain the final registered image candidates.

For example, for the second registered image candidates selected by the registered image candidate selecting process 4, a registered image candidate selecting process 1 or 2 or 3 is performed to obtain the final registered image candidates.

As another example, a logical AND is taken with the first registered image candidates selected by a registered image candidate selecting process 1 or 2 or 3, with the second registered image candidates selected by the registered image candidate selecting process 4, to produce the final registered image candidates.

As yet another example, a logical OR is taken with the first registered image candidates selected by a registered image candidate selecting process 1 or 2 or 3, with the second registered image candidates selected by the registered image candidate selecting process 4, to produce the final registered image candidates.

Note that while in this example the intraocular distance was obtained as a measured value from the reference image, instead the face size, eye size, face curvature, or the like; may be obtained, and the first registered image candidates may be selected based on the measured values thus obtained.

Figure 10:
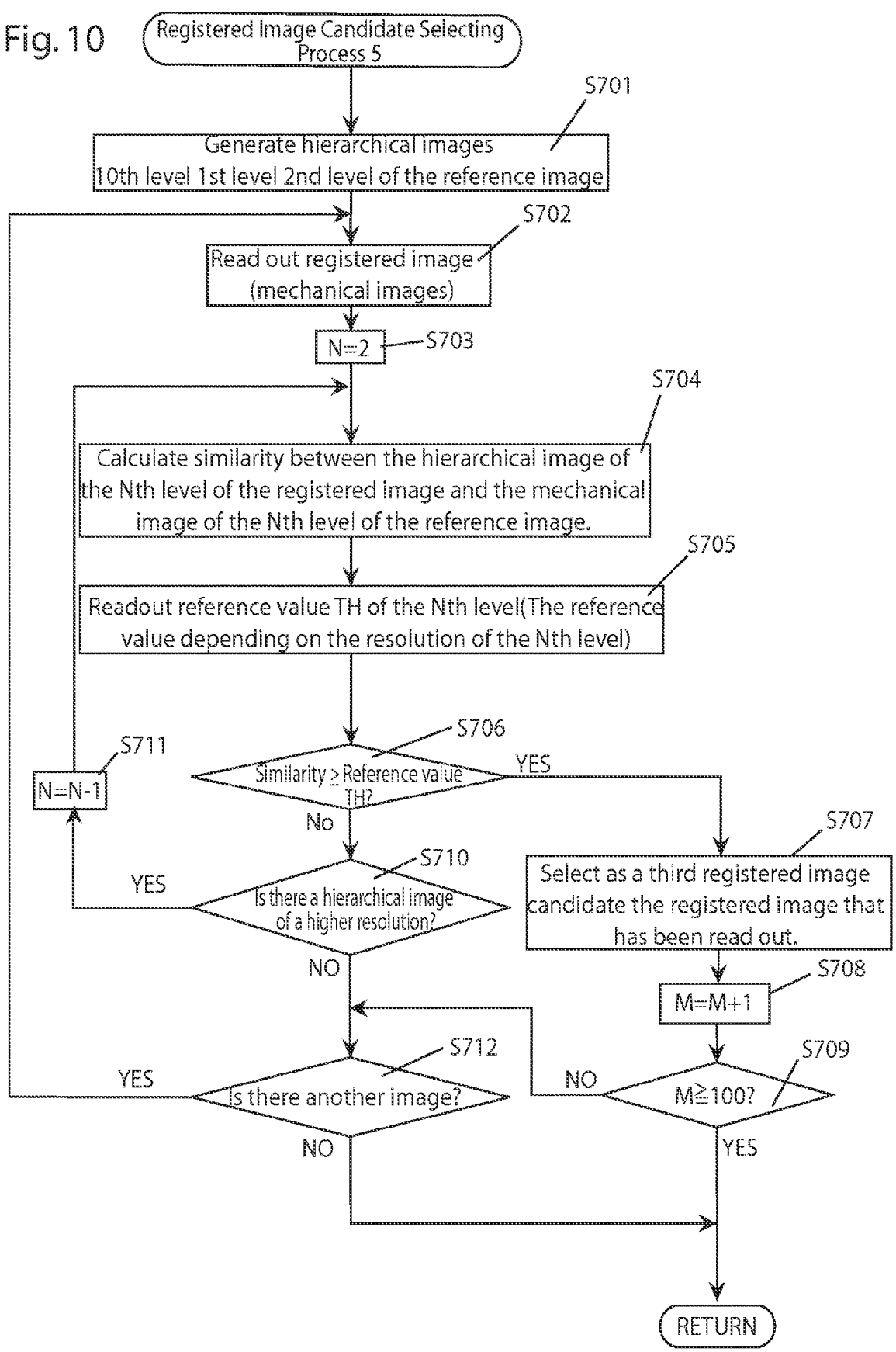
FIG. 10 is a flowchart of a registered image process 5 wherein the registered image candidate selecting processes 1, 2, and 3 are used in combination.

A flowchart of the registered image candidate selecting process 5 is shown in FIG. 10. In this, the registered image candidate selecting processes 1, 2, and 3 are combined with this registered image candidate selecting process 5, to produce the final registered image candidates. Note that in the previous example, the registered image candidates selected by the registered image candidate selecting processes 1, 3, and 3 are defined as first registered image candidates, and the registered image candidates selected by the registered image candidate selecting process 5 are defined as second registered image candidates.

In this registered image candidate selecting process 5, the controlling portion 20-1 defines the raw image of the reference image obtained in Step S205 (a 128×128-pixel image) as the high-resolution image of the highest level (the zeroeth level), generates a 64×64-pixel image (a first low-resolution image) on the level below the high-resolution image (the first level), and generates a 32×32-pixel image (the second low-resolution image) at the level below the first low-resolution image (the second level) (Step S701, referencing FIG. 5(b)).

Additionally, the controlling portion 20-1 reads out the first registered image (the hierarchical images including the raw image) that is stored on the hard disk 20-4 (Step S702). That is, for the first registered image, the high-resolution image (the 128×128-pixel image) positioned at the highest level (the zeroeth level), the first low-resolution image (the 64×64-pixel image) that is positioned on the level below the high-resolution image (the first level), and the second low-resolution image (the 32×32-pixel image) that is positioned on the level below the first low-resolution image (the second level), are read out (referencing FIG. 5(a)).

Given this, the controlling portion 20-1 defines N=2 (Step S703), and calculates the similarity between the hierarchical image of the $N^{th}$ level of the reference image and the hierarchical image of the $N^{th}$ level of the registered image (Step S704). In this case, N=2, and thus the similarity between the hierarchical image 12 of the second level of the reference image and the hierarchical image J2 of the second level of the registered image is calculated.

After this, a reference value TH for the second level, determined in advance, is read out (Step S705), and the calculated similarity value is compared to the reference value TH for the second level, which has been read out (Step S706). Here the reference value TH for the second level is determined in accordance with the resolution of the hierarchical level.

If the calculated similarity is equal to or greater than the second level reference value TH (Step S706: YES), then the registered image read-out in Step S702 is selected as a registered image candidate (a third registered image candidate) (Step S707), and the number M (which has an initial value of 0) of selected registered image candidates is set to M=M+1 (Step S708).

After this, after confirming that the number M of selected registered image candidates has not reached 100 (Step S709: NO), and after confirming that there is still another registered image on the hard disk 20-4 (Step S712: YES), the next registered image is read out from the hard disk 20-4 (Step S702), and processing repeats from Step S703.

If the calculated similarity is not equal to or greater than the second level reference value TH (Step S706: NO), then after confirming that there is a hierarchical image with a higher resolution (Step S710: YES), N is set to N-1 (Step S711), and processing returns to Step S704. In this case, N=1, and thus the controlling portion 20-1 calculates the similarity between the hierarchical image I1 of the first level of the reference image and the hierarchical image J1 of the first level of the registered image.

After this, a reference value TH for the first level, determined in advance, is read out (Step S705), and the calculated similarity value is compared to the reference value TH for the first level, which has been read out (Step S706). Here the reference value TH for the first level is determined in accordance with the resolution of the hierarchical level.

If the calculated similarity is equal to or greater than the first level reference value TH (Step S706: YES), then the registered image read-out in Step S702 is selected as a registered image candidate (a third registered image candidate) (Step S707), and the number M of selected registered image candidates is set to M=M+1 (Step S708).

After this, after confirming that the number M of selected registered image candidates has not reached 100 (Step S709: NO), and after confirming that there is still another registered image on the hard disk 20-4 (Step S712: YES), the next registered image is read out from the hard disk 20-4 (Step S702), and processing repeats from Step S703.

If the calculated similarity is not equal to or greater than the first level reference value TH (Step S706: NO), then after confirming that there is a hierarchical image with a higher resolution (Step S710: YES), N is set to N-1 (Step S711), and processing returns to Step S704. In this case, N=0, and thus the controlling portion 20-1 calculates the similarity between the hierarchical image 10 of the zeroeth level of the reference image and the hierarchical image J0 of the zeroeth level of the registered image.

After this, a reference value TH for the zeroeth level, determined in advance, is read out (Step S705), and the calculated similarity value is compared to the reference value TH for the zeroeth level, which has been read out (Step S706). Here the reference value TH for the zeroeth level is determined in accordance with the resolution of the hierarchical level.

If the calculated similarity is equal to or greater than the first level reference value TH (Step S706: YES), then the registered image read-out in Step S702 is selected as a registered image candidate (a third registered image candidate) (Step S707), and the number M of selected registered image candidates is set to M=M+0 (Step S708).

After this, after confirming that the number M of selected registered image candidates has not reached 100 (Step S709: NO), and after confirming that there is still another registered image on the hard disk 20-4 (Step S712: YES), the next registered image is read out from the hard disk 20-4 (Step S702), and processing repeats from Step S703.

If the calculated similarity is not equal to or greater than the zeroeth level reference value TH (Step S706: NO), then the controlling portion 20-1 checks whether or not there is a hierarchical image with a higher resolution (Step S710: YES). In this case, there is no hierarchical image with a higher resolution than the zeroeth level (Step S710: NO), so after confirming that there is another registered image on the hard disk 20-4 (Step S712: YES), the next registered image is read out from the hard disk 20-4 (Step S702), and the process repeats from Step S703.

Through the above, the hierarchical images of the registered images are read out sequentially from the hard disk 20-4, and the similarities between the hierarchical images of the registered images and the hierarchical images of the reference image are calculated sequentially starting with the lowest resolution, where the calculated similarities are compared to the reference values TH for the hierarchical levels, to select, as a third registered image candidates, the registered images wherein the similarity on one of the hierarchical levels is confirmed to be no less than the threshold value TH.

Given this, if, during the iteration of these processes, the number M of selected registered image candidates reaches 100 (Step S709: YES), then the controlling portion 20-1 terminates the registered image candidate selecting process. Moreover, if there are no more registered images prior to the number M of selected registered image candidates reaching 100 during the iteration of these processes (Step S413: NO), then the registered image candidate selecting process is terminated.

Given this, the controlling portion 20-1 combines the second registered image candidates, selected by the registered image candidate selecting process 5, with the first registered image candidates, selected by the registered image candidate selecting processes 1, 3, and 3, to obtain the final registered image candidates.

For example, for the second registered image candidates selected by the registered image candidate selecting process 5, a registered image candidate selecting process 1 or 3 or 3 is performed to obtain the final registered image candidates.

As another example, a logical AND is taken with the first registered image candidates selected by a registered image candidate selecting process 1 or 2 or 3, with the third registered image candidates selected by the registered image candidate selecting process 5, to produce the final registered image candidates.

As a further example of the above, a logical OR is taken with the first registered image candidates selected by a registered image candidate selecting process 1 or 2 or 3, with the third registered image candidates selected by the registered image candidate selecting process 5, to produce the final registered image candidates.

Note that while in an example the registered image candidate selecting process 5 was combined with the registered image candidate selecting processes 1, 2, and 3 to produce the final registered image candidates, instead the registered image candidate selecting processes 4 and 5 may be combined with the registered image candidate selecting processes 1, 2, and 3, to produce the final registered image candidates.

Additionally, while in the examples set forth above, the registered image candidate selecting was performed until M=100 was achieved, instead the registered image candidate selecting processes 4 and 5 may be combined with the registered image candidate selecting processes 1, 2, and 3, to produce the final registered image candidates. For example, in terms of the example in FIG. 4, if in Step S306 the similarity is at or above a specific value THmax that is much higher than the reference value TH, then the registered image candidate selections may be stopped at that point. Same is true for the example in FIG. 10 as well, where if in Step S706 the similarity is at or above a specific value THmax that is much higher than the reference value TH, then the third registered image candidate selections may be stopped at that point. Doing so enables the achievement of higher speeds.

Additionally, while in the examples set forth above, the registered image candidate selecting was performed until M=100 was achieved, instead a comparing process for categorizing all of the registered images may be performed, and the M units that are top ranked in terms of the similarities (a score) may be selected as the registered image candidates. For example, in terms of the example in FIG. 4, similarities are calculated by performing a comparing process for categorizing all of the registered images that are stored on the hard disk 20-4, and the M registered images with the highest similarities are selected as registered image candidates. The same is true for the example in FIG. 10 as well, where similarities are calculated by performing a comparing process for categorizing all of the registered images that are stored on the hard disk 20-4, and the M registered images with the highest similarities are selected as third registered image candidates.

Moreover, while in the examples set forth above, the methods for calculating similarities (in, for example, similarity calculating methods such as in Step S208 (FIG. 3), Step S305 (FIG. 4), Step S406 (FIG. 7), Step S506 (FIG. 8), Step S704 (FIG. 10), and the like) were described in detail, in this case, the following methods can be considered as the methods for calculating the similarity.

Methods for Calculating Similarities for Specific Face Data, Specific Hierarchical Levels, and Specific Areas Approach 1. Similarity is defined as the average value of the correlation values for each corresponding point.

Approach 2. Similarity is defined as the number of corresponding points higher than a threshold value T.

Reduces susceptibility to the effects of external noises (such as clothing or accessories) in specific areas.

Approach 3. Similarity is defined as the number of points of correspondence higher than a threshold value "T_high" for each area such as top, bottom, left, right, all. The threshold value "T_high" may be different for each area.

Enables comparisons that are less affected by, for example, sunglasses, spectacles, new beards, scars, eye patches, and the like.

Approach 4. Similarity is defined as the number of points of correspondence higher than a threshold value "T_high" for each area such as top, bottom, left, right, all. At this time, if there is a large number of points wherein the correspondence is lower than a threshold "T_low" in any of the areas, then the result will be a non-match in a subsequent similarity evaluating process. The threshold values "T_high" and "T_low" may be different for each area.

This is able to prevent misidentification as somebody else when the same clothing or accessories are worn. For example, eye glasses with thick frames will not cause an incorrect identification.

Note that while in the example of FIG. 4, the similarity was calculated in Step S305, and the similarity was compared to a reference value in Step S306, instead the calculation of the similarity in the comparison to the reference value may be performed in a single step. The same is true for the other examples as well.

Moreover, while in the examples set forth above, the hierarchical images for the registered images were stored as registered images on the hard disk 20-4, instead the raw images for the registered images may be stored alone. When storing only the raw images for the registered images, the raw image for the registered image, after reading out, is defined as the high-resolution image of the highest level (the zeroeth level), and a first low-resolution image is generated at the level below the high-resolution image (the first level), and a second low-resolution image is produced at the level below this first low-resolution image (the second level).

Figure 11:
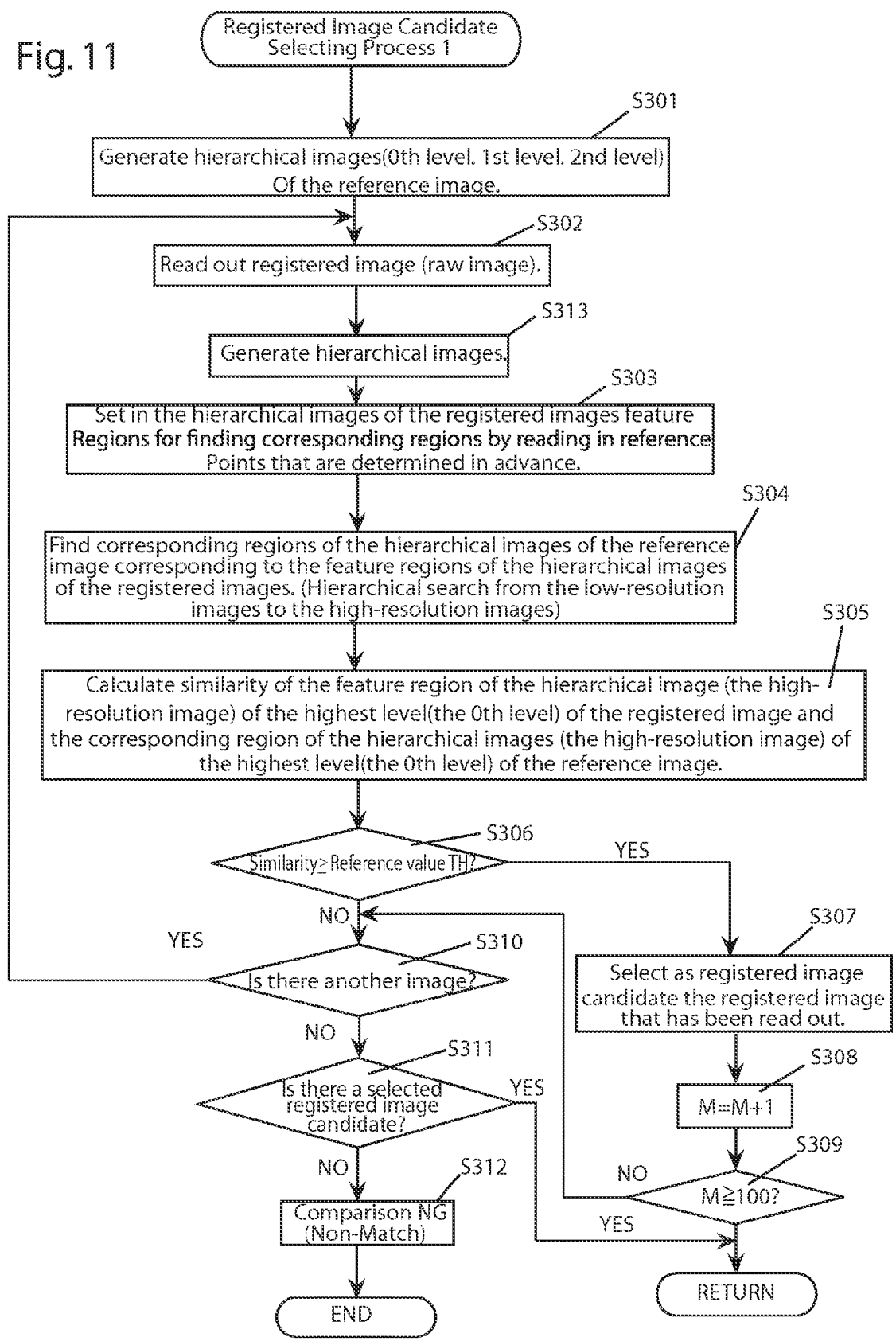
FIG. 11 is a flowchart illustrating an alternate example of the Registered Image Candidate Selecting Process 1.

A flowchart for the case of generating the hierarchical images for the registered images after reading out the registered images (the raw images) in the registered image candidate selecting process 1 is shown in FIG. 11. In this case, the raw image of the registered image is read out in Step S302, and, after this Step S302, a Step S313 is provided for generating the hierarchical images for the registered image.

A flowchart for the case of generating the hierarchical images for the registered images after reading out the registered images (the raw images) in the registered image candidate selecting process 2 is shown in FIG. 12. In this case, the raw image of the registered image is read out in Step S402, and, after Step S402, a Step S417 is provided for generating the hierarchical images for the registered image.

A flowchart for the case of generating the hierarchical images for the registered images after reading out the registered images (the raw images) in the registered image candidate selecting process 3 is shown in FIG. 13. In this case, the raw image of the registered image is read out in Step S503, and, after Step S503, a Step S517 is provided for generating the hierarchical images for the registered image.

A flowchart for the case of generating the hierarchical images for the registered images after reading out the registered images (the raw images) in the registered image candidate selecting process 5 is shown in FIG. 14. In this case, the raw image of the registered image is read out in Step S702, and, after Step S702, a Step S713 is provided for generating the hierarchical images for the registered image.

The comparing device according to the present invention, as a comparing device for comparing a reference image and a registered image can be used in systems for authenticating a variety of subjects (such as checking images such as prints, checking soldered circuit boards, and the like), rather than being limited to systems for controlling entry/exit.

The invention claimed is:

1. A comparing device for comparing a reference image and a registered image, comprising:
   a hierarchical image generator generating a plurality of hierarchical images of different resolutions, with the raw image as a high-resolution image of the highest resolution, with this high-resolution image as the highest level;
   a registered image storage storing a plurality of registered images of the same resolution as the reference image;
   a registered image reader reading out, one-at-a-time, registered images stored in the registered image storage;
   a feature region setting device setting a feature region, determined in advance, for either a hierarchical image of the reference image, generated by the hierarchical image generator, or a hierarchical image of the reference image corresponding to a hierarchical image of the reference image of a registered image read out by the registered image reader;
   a corresponding region searching device searching, in the other hierarchical image, a corresponding region that corresponds to the feature region of the hierarchical image for which the feature region is set by the feature region setting device; and
   a first recorded image candidate selector selecting a registered image candidate for comparing a registered image, read out by the registered image reader, to a reference image based on a similarity between a feature region that is established for one hierarchical image by the feature region setting device and a corresponding region, found in the other hierarchical image, by a corresponding region finding device.

2. The comparing device as set forth in claim 1, wherein:
   the corresponding region searching device searches, through hierarchical searching from the low-resolution image to the high-resolution image, for a corresponding region in another hierarchical image corresponding to a feature region set in one hierarchical image; and
   a first registered image candidate selecting device selects, as registered image candidates, registered images read out by the registered image reader when a calculated similarity satisfies a specific reference value when a similarity between a feature region and a corresponding region is calculated starting with an arbitrary low-resolution hierarchical image.

3. The comparing device as set forth in claim 2, wherein:
the first registered image candidate selecting device uses, as the reference value for each hierarchical level of the hierarchical images, a reference value established in accordance with the resolution of the hierarchical level and in accordance with the position of the feature region.

4. The comparing device as set forth in claim 1, comprising:
- a measured information acquiring device acquiring specific measured information from the reference image; and
- a second registered image candidate selector selecting a registered image candidate, for comparing with the reference image, from a plurality of registered images stored in the registered image storage based on measured information acquired by the measured information acquiring device; wherein:
- the first registered image candidate selector selects a registered image candidate in combination with a registered image candidate selected by the second registered image candidate selector.

5. The comparing device as set forth in claim 1, wherein:
the first registered image selector defines the comparing result for the reference image and the registered image as non-matching when the number of selected registered image candidates is 0.

* * * * *